(12) United States Patent
Legus

(10) Patent No.: US 10,638,672 B2
(45) Date of Patent: May 5, 2020

(54) COLLAPSIBLE PLANT SUPPORT

(71) Applicant: Chad M. Legus, Elkhart, IN (US)

(72) Inventor: Chad M. Legus, Elkhart, IN (US)

(*) Notice: Subject to any disclaimer, the term of this patent is extended or adjusted under 35 U.S.C. 154(b) by 0 days.

(21) Appl. No.: 16/027,088

(22) Filed: Jul. 3, 2018

(65) Prior Publication Data

US 2019/0008098 A1 Jan. 10, 2019

Related U.S. Application Data

(63) Continuation of application No. 15/660,726, filed on Jul. 26, 2017, now Pat. No. 10,034,436, which is a continuation-in-part of application No. 14/251,038, filed on Apr. 11, 2014, now Pat. No. 9,717,188.

(51) Int. Cl.
| | |
|---|---|
| *A01G 9/12* | (2006.01) |
| *A01G 17/06* | (2006.01) |
| *A01G 17/04* | (2006.01) |
| *A01G 13/02* | (2006.01) |
| *B29C 45/14* | (2006.01) |
| *A01G 17/00* | (2006.01) |
| *A01G 9/00* | (2018.01) |
| *B29L 31/06* | (2006.01) |
| *B29L 31/00* | (2006.01) |

(52) U.S. Cl.
CPC ............ *A01G 17/06* (2013.01); *A01G 9/12* (2013.01); *A01G 13/0243* (2013.01); *A01G 17/04* (2013.01); *B29C 45/14* (2013.01); *B29C 45/14622* (2013.01); *A01G 9/00* (2013.01); *A01G 17/00* (2013.01); *B29L 2031/06* (2013.01); *B29L 2031/7004* (2013.01)

(58) Field of Classification Search
CPC .......... A01G 9/12; A01G 9/126; A01G 17/04; A01G 17/06; A01G 13/0237; A01G 13/0243
USPC ............... 47/24.1, 29.6, 31, 31.1, 44, 45, 47
See application file for complete search history.

(56) References Cited

U.S. PATENT DOCUMENTS

| | | | | | |
|---|---|---|---|---|---|
| 2,935,811 | A | * | 5/1960 | Hurtig | A01K 69/08 43/105 |
| 3,014,516 | A | * | 12/1961 | Mueller | B65D 37/00 138/131 |
| 3,336,696 | A | * | 8/1967 | Jackson, Jr. | A01G 5/00 47/41.13 |
| 5,301,465 | A | * | 4/1994 | Caferro | A01G 9/022 47/65.8 |

(Continued)

*Primary Examiner* — David J Parsley
*Assistant Examiner* — Danielle A Clerkley
(74) *Attorney, Agent, or Firm* — Larry E. Henneman, Jr.; Henneman & Associates, PLC

(57) ABSTRACT

A novel collapsible plant support includes a collapsible coil adapted to rest on a flat surface. In a particular embodiment, the collapsible plant support includes a plurality of vertical support structures coupled to the collapsible coil so as to provide additional support. In another particular embodiment, a collapsible plant support includes plant receptacle receiving element that supports both a collapsible coil and also a plant receptacle. In a more particular embodiment, the plant receptacle receiving element includes fluid ducts for connecting multiple plant receptacle receiving elements into a fluid network. In another embodiment, the coil is disposed within a helical sleeve coupled to a flexible, cylindrical mesh.

18 Claims, 27 Drawing Sheets

(56) References Cited

U.S. PATENT DOCUMENTS

| | | | | |
|---|---|---|---|---|
| 5,471,788 A | * | 12/1995 | Willes | A01G 23/02 |
| | | | | 47/73 |
| 6,830,170 B2 | * | 12/2004 | Abel | A01M 31/006 |
| | | | | 190/107 |
| 8,511,895 B2 | * | 8/2013 | Burchfield | B65F 1/0006 |
| | | | | 248/99 |
| 9,179,608 B2 | * | 11/2015 | Kempf | A01G 23/04 |
| 2003/0183630 A1 | * | 10/2003 | Schneider | A45C 7/0077 |
| | | | | 220/9.2 |
| 2009/0277084 A1 | * | 11/2009 | Kempf | A01G 9/029 |
| | | | | 47/66.3 |
| 2010/0186792 A1 | * | 7/2010 | Imhof | E04H 15/40 |
| | | | | 135/121 |

* cited by examiner

COLLAPSIBLE PLANT SUPPORT

CROSS-REFERENCE TO RELATED APPLICATIONS

This application is a continuation of U.S. patent application Ser. No. 15/660,726, filed Jul. 26, 2017 by the same inventor, which is a continuation-in-part of co-pending U.S. patent application Ser. No. 14/251,038, filed Apr. 11, 2014 by at least one common inventor, each of which is incorporated herein by reference in its entirety.

BACKGROUND OF THE INVENTION

Field of the Invention

This invention relates generally to gardening, and more particularly to plant support structures. Even more particularly, the invention relates to plant support structures adapted for use on hard, flat surfaces, and more particularly still with plant receptacles (i.e. buckets).

Description of the Background Art

In gardening, load supporting structures are often used to provide additional support to plants such as, for example, fruit bearing plants. Typically, such structures include a rigid grid-like structure that is placed near, or around, a plant in the early stages of growth. As the plant matures, it grows around and/or through the structure such that the structure supports a significant amount of the plant's weight.

One common type of load supporting structure is the conventional tomato cage. A conventional tomato cage typically includes a cylindrical wire grid and a plurality of relatively sharp stakes extending downward therefrom. The cylindrical wire grid includes a plurality of vertical and horizontal members welded together. The vertical members support the horizontal members and the horizontal members provide support to the plant. The stakes extend downward such that the tomato cage can be securely inserted into the soil surrounding the plant.

There are several disadvantages associated with conventional plant load supporting structures (e.g., a tomato cage). For example, conventional load supporting structures are relatively bulky and, therefore, difficult to store and/or ship. As another example, they have to be staked into the soil surrounding the plant. Consequently, conventional plant load supporting members are susceptible to tip when the weight of the plant becomes too great or unbalanced. As another consequence of having to be staked into the soil, conventional load supporting structures cannot be used in situations wherein soft soil is not available such as, for example, when the plant is growing out of hard mediums (e.g. hydroton). As yet another consequence, many plants are grown in pots and/or buckets where there is little room for stakes to be pressed into soil. Additionally, such pots and/or buckets typically rest on hard surfaces (e.g., decks, patios, etc.), which the stakes of the plant supporting structure cannot be driven into.

In efforts to make plant supporting structures less bulky, various collapsible plant supporting structures have been developed. For example, U.S. Pat. No. 4,860,489 (Bork) discloses an adjustable plant support that is collapsible so that it is easier to ship and/or store than conventional plant supporting structures. The adjustable plant support of Bork includes a coil that is supported by a pair of stakes that stick into the ground. The coil is coupled to the stakes via a set of clamps that also retain the coil in a decompressed position. When not being pulled apart in a decompressed position by the clamps, the coil has a natural tendency to retract in a compressed position.

Although the adjustable plant support of Bork is less bulky and easier to ship than conventional plant supporting structures, it too has disadvantages. For example, the adjustable plant support of Bork requires a set of stakes to secure it to the ground. Consequently, the adjustable plant support of Bork suffers the aforementioned drawbacks associated with stakes. As another example, the adjustable plant support of Bork does not include vertical members that prevent horizontal movement of the plant.

What is needed, therefore, is a plant supporting structure that does not need to be staked to the ground. What is also needed is a plant supporting structure that provides horizontal support to plants. What is also needed is a plant support structure that can be used on hard and/or impenetrable surfaces.

SUMMARY

The present invention overcomes the problems associated with the prior art by providing a collapsible plant support structure. The invention facilitates the support of growing plants on hard or impenetrable surfaces. The support structure can be used on hard, flat surfaces and is collapsible for easy, compact storage.

An example collapsible plant support structure includes a collapsible coil, a bottom, and a plurality of retainers. The collapsible coil has an axis, a bottom end and a top end. The bottom is coupled to the bottom end of the collapsible coil and adapted to support the collapsible plant support on a flat horizontal surface with the axis perpendicular to the flat horizontal surface. The retainers are coupled to the bottom end of the collapsible coil and the top end of the collapsible coil, and are adapted to restrain the collapsible coil in a deployed position.

In an example embodiment, the plurality of retainers includes a plurality of vertical support structures, which remain entirely at or above the bottom of the collapsible plant support structure. Optionally, portions of the vertical support structures form at least a portion of the bottom of the collapsible plant support structure.

In example embodiments, each of the plurality of the support structures includes a first coil engaging feature, a second coil engaging feature, and a rigid member coupled between the first coil engaging feature and the second coil engaging feature. The first coil engaging feature is adapted to engage a portion of the collapsible coil at the top end of the collapsible coil, and the second coil engaging feature adapted to engage a portion of the collapsible coil at the bottom end of the collapsible coil. Optionally, the rigid members include a plurality of intermediate coil engaging features adapted to engage turns of the collapsible coil between the top end of the collapsible coil and the bottom of the collapsible coil. In one of the example embodiments, the collapsible coil tends to expand beyond the deployed position, and the support structures restrain the collapsible coil from expansion beyond the deployed position. In another of the example embodiments, the collapsible coil tends to contract from the deployed position, and the support structures restrain the collapsible coil from contracting from the deployed position.

In other disclosed embodiments, the collapsible plant support structure includes a plurality of vertical support engaging structures fixed to the collapsible coil. For example, a first set of vertical support structure engaging devices is coupled to the top end of the collapsible coil, each device being adapted to engage a top end of a respective one of the vertical support structures. In addition, a second set of vertical support structure engaging features is coupled to the bottom end of the collapsible coil, each device being adapted to engage a bottom end of a respective one of the vertical support structures.

In some example embodiments, in addition to or instead of the vertical supports, the plurality of retainers includes a plurality of flexible elements coupled between the bottom end of the collapsible coil and the top end of the collapsible coil. In one such embodiment, the collapsible coil includes a plurality of helical turns, and at least one of the flexible elements is coupled to the bottom end of the collapsible coil, the top end of the collapsible coil, and every helical turn therebetween. In one such embodiment, each of the plurality of flexible elements is a cord (e.g., string, rope, braided wire, etc.).

In some of the example embodiments, the bottom end of the collapsible coil forms at least a portion of the bottom of the collapsible plant support structure. For example, several winds of the coil can be bound together to form a flat, circular bottom. Optionally, the inner diameter of the collapsible coil is greater than 12 inches, to accommodate the placement of a plant receptacle (e.g., a pot, five gallon bucket, etc.).

Optionally, the bottom of the collapsible plant support structure includes a base coupled to the bottom end of the collapsible coil. In some embodiments, the base is a rigid structure, whereby the collapsible plant support is stabilized by weight (e.g., a potted plant) placed on the base. Examples of a rigid base include, but are not limited to, a bar, a plate, and a pan. In other embodiments, the base is a flexible structure (e.g., a cord, a strap, etc.) coupled across the bottom end of the collapsible coil, whereby the collapsible plant support is stabilized by weight placed on the base.

In another example embodiment, a collapsible plant support structure includes a collapsible coil, a bottom, a plurality of vertical flexible elements, a plurality of vertical supports, and a plurality of coil engaging features. The collapsible coil has an axis, a bottom end and a top end. The bottom of the plant support structure is coupled to the bottom end of the collapsible coil and is adapted to support the collapsible plant support on a flat, horizontal surface with the axis perpendicular to the flat, horizontal surface. The vertical flexible elements are each coupled to the bottom end of the collapsible coil, the top end of the collapsible coil, and intermediate turns of the collapsible coil. The vertical supports are adapted to restrain the collapsible coil in a deployed position. The coil engaging features are adapted to couple the vertical supports to the collapsible coil. Optionally, the plant support structure additionally includes a flexible covering molded around the collapsible coil. The vertical flexible elements and the coil engaging features are also molded onto the collapsible coil.

A method of manufacturing a collapsible plant support structure is also disclosed. The method includes providing a collapsible coil having an axis, a bottom end and a top end. The method additionally includes molding a plurality of vertical flexible elements to the bottom end of the collapsible coil, the top end of the collapsible coil, and intermediate turns of the collapsible coil. A plurality of vertical supports adapted to restrain the collapsible coil in a deployed position is provided, and the method additionally includes molding a plurality of coil engaging features onto the collapsible coil. The coil engaging features are adapted to couple the vertical supports to the collapsible coil. In a particular example method, the vertical flexible elements and the coil engaging features are molded in a single molding process. Optionally, a flexible covering can be molded around the collapsible coil as part of the single molding process.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a collapsible plant support structure that is adapted to rest on a substantially flat surface. In the following description, numerous specific details are set forth (e.g., number of coils, types of vertical support structures, etc.) in order to provide a thorough understanding of the invention. Those skilled in the art will recognize, however, that the invention may be practiced apart from these specific details. In other instances, details of well-known coil manufacturing practices (e.g., wire extrusion, wire bending/welding, etc.) and components have been omitted, so as not to unnecessarily obscure the present invention.

Figure 1:
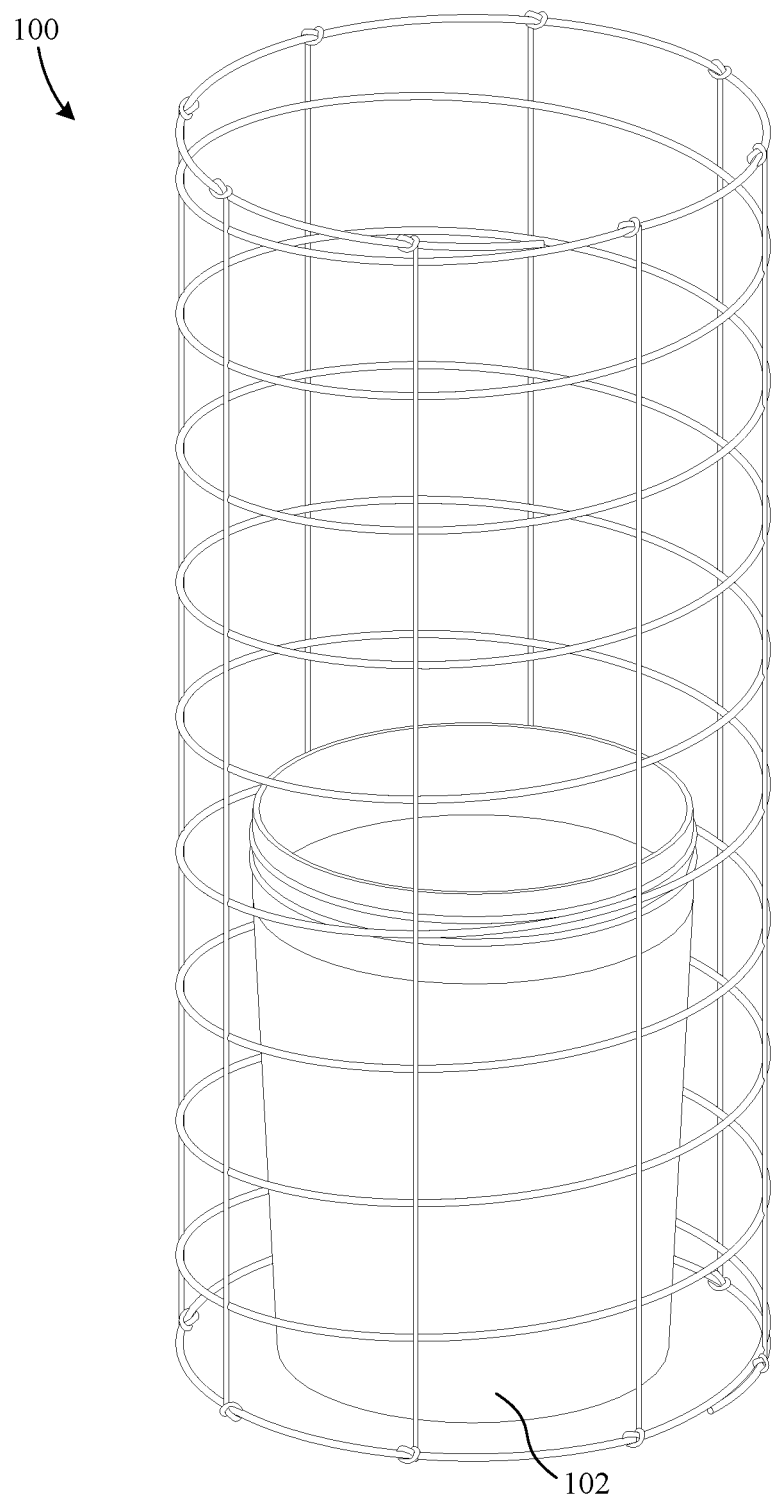
FIG. 1 is a perspective view of a plant support structure positioned around a bucket.

FIG. 1 shows perspective view of a collapsible plant support structure 100 having a bucket 102 disposed therein. Plant support structure 100 is operative to provide additional support to plants growing out of bucket 102. As shown, plant support structure 100 is adapted to rest on a flat surface on which bucket 102 is also supported. This is particularly advantageous in scenarios such as, for example, when using bucket 102 to grow plants indoors wherein plant support structure 100 and bucket 102 would rest on a floor. Unlike prior art plant supports, collapsible plant support structure 100 does not require being staked into underlying soil. That is, plant support structure 100 is self-supporting on planar surfaces.

Figure 2:
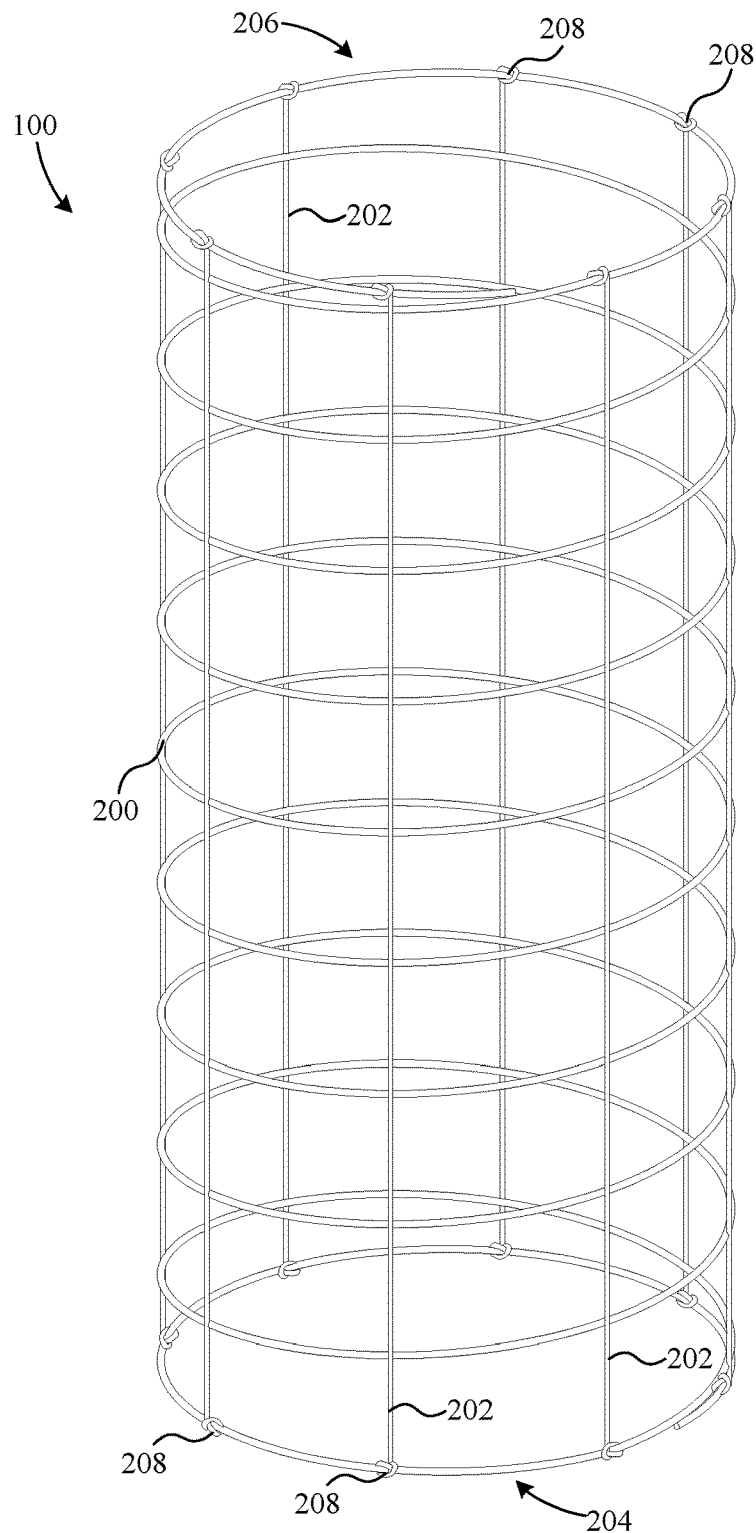
FIG. 2 is a perspective view of the plant support structure of FIG. 1.

FIG. 2 shows a perspective view of collapsible plant support structure 100 in an open (deployed) position. In this particular embodiment, collapsible plant support structure 100 includes a collapsible coil 200 and plurality of vertical structures 202 coupled thereto. Collapsible coil 200 is essentially a large metal wire coil having a somewhat low resistance to compression such that it can be easily compressed to a very small size during shipping and/or storage. Of course, coil 200 also has a resistance to compression sufficient to support plants without collapsing. Coil 200 includes a bottom region 204 and an opposite top region 206. Bottom region 204 is defined by a portion of coil 200 that is wound in a plane such that bottom region 204 is adapted to rest on a flat surface (i.e. floor). In this example, vertical structures 202 are operative to limit horizontal movement of plant branches extending out of collapsible plant support structure 100. This is beneficial in that the weight of the plant is more evenly distributed about collapsible plant support structure 100 when branches are not free to move horizontally. In this example, vertical structures 202 are formed from individual pieces of string that are each tied into knots 208 attached to both bottom region 204 and top region 206. Although each piece of string is tied to coil 200 with two knots 208, each of vertical structures 202 could be tied to each turn of coil 200 to further limit relative horizontal movement between vertical structures 202 and coil 200. In other words, each contact point between coil 200 and vertical structures 202 would be coupled via a knot.

In this embodiment, vertical structures 202 also serve as retainers, because they prevent coil 200 from expanding beyond its intended deployed position. In other words, vertical structures 202 restrain coil 202 in its deployed position.

Figure 3:
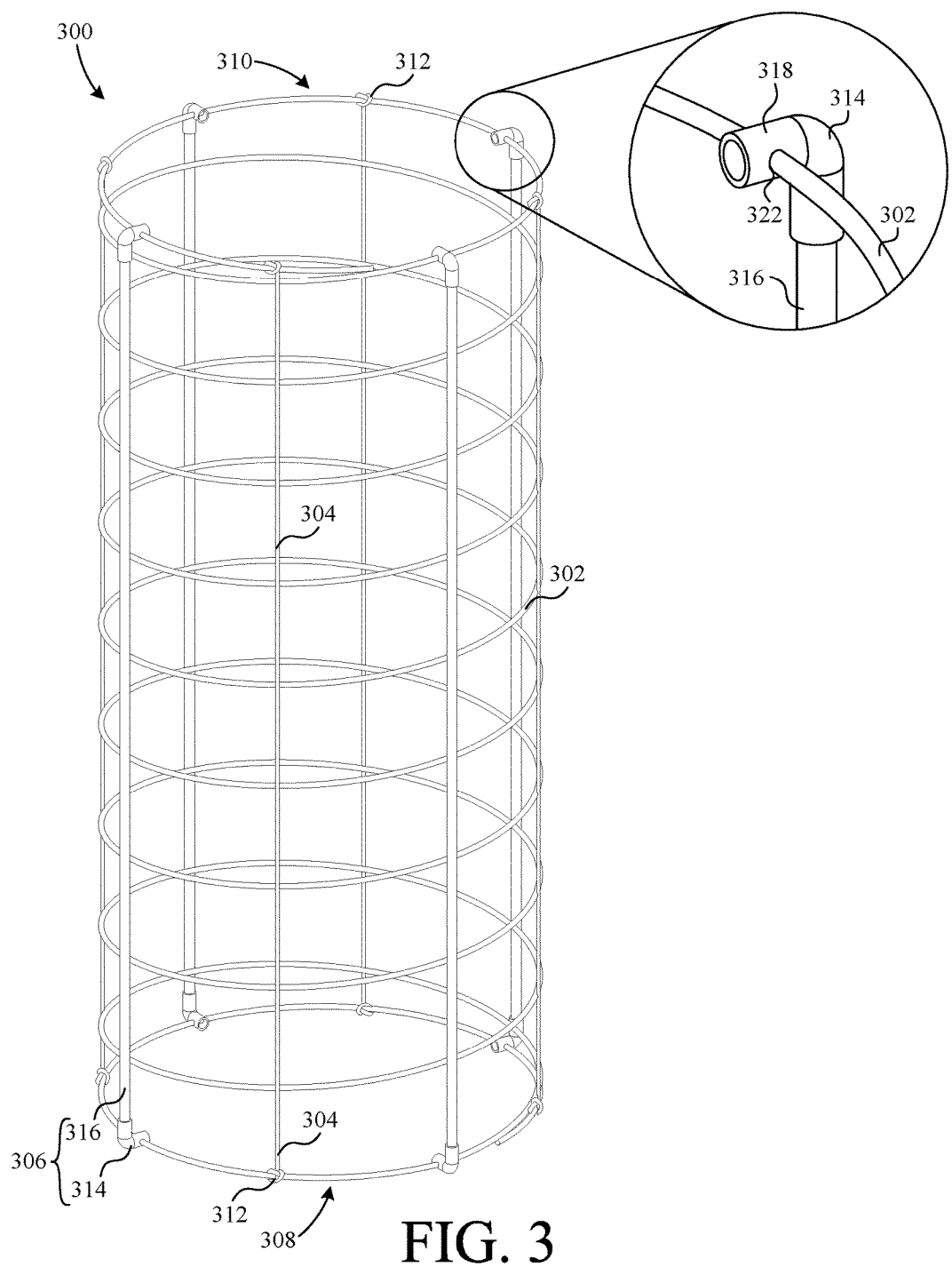
FIG. 3 is a perspective view of a plant support structure according to another embodiment of the present invention.

FIG. 3 shows a perspective view of a collapsible plant support structure 300 according to another embodiment of the present invention. Plant support structure 300 provides additional support to plants, beyond that which would be provided by the previous embodiment. Plant support structure 300 includes a collapsible coil 302, a plurality of vertical structures 304, and a plurality of vertical support structures 306. Collapsible coil 302 is substantially similar to coil 200 in that the only difference is that coil 302 is naturally in a collapsed state when not being held open by vertical support structures 306. In other words, coil 200 (FIG. 2) is naturally open tends toward expansion), but has to be secured in a collapsed position during storage. In contrast, coil 302 is naturally in a collapsed position (tends toward contraction), but requires being held open by vertical support structures 306 during operation. Thus, vertical support structures 306 serve as retainers, restraining coil 302 in a deployed position.

Coil 302 includes a bottom region 308 and an opposite top region 310. Bottom region 308 is defined by a portion of coil 302 that is wound in a plane such that bottom region 308 is adapted to rest on a flat surface (i.e. floor). In this example, vertical structures 304 are operative to limit horizontal movement of plant branches extending out of collapsible plant support structure 300. This is beneficial in that the weight of the plant is more evenly distributed about collapsible plant support structure 300 when branches are not free to move horizontally. In this example, vertical structures 304 are formed from individual pieces of string that are each tied into knots 312 attached to both bottom region 308 and top region 310.

Each of vertical support structures 306 includes two coil engaging features 314 and a columnar structure 316 disposed therebetween. In this example, coil engaging features 314 are plastic elbow couplings having a first end 318 coupled to coil 302 and a second end 320 coupled to a respective one of columnar structures 316. Each first end 318 of coil engaging features 314 includes an aperture 322 through which coil 302 is disposed. Each second end 320 is friction fit to a respective end of a respective one of columnar structures 316. Each of columnar structures 316 is a rigid pole or tube formed from some suitable material such as, for example, plastic, wood, fiberglass, etc. The rigidity and strength of columnar structures 316 is such that they do not buckle under the spring force of coil 302 and the weight of a plant growing out of collapsible plant support structure 300. In addition to providing vertical support, columnar structures 316 also provide horizontal support to plants growing from plant support structure 300. Collapsible plant support structure 300 can be stored simply by sliding columnar structures out of second ends 320 of coil engaging features 314. With coil engaging features 314 removed, coil 302 collapses down into a small form factor for storage, shipping, etc.

Figure 4:
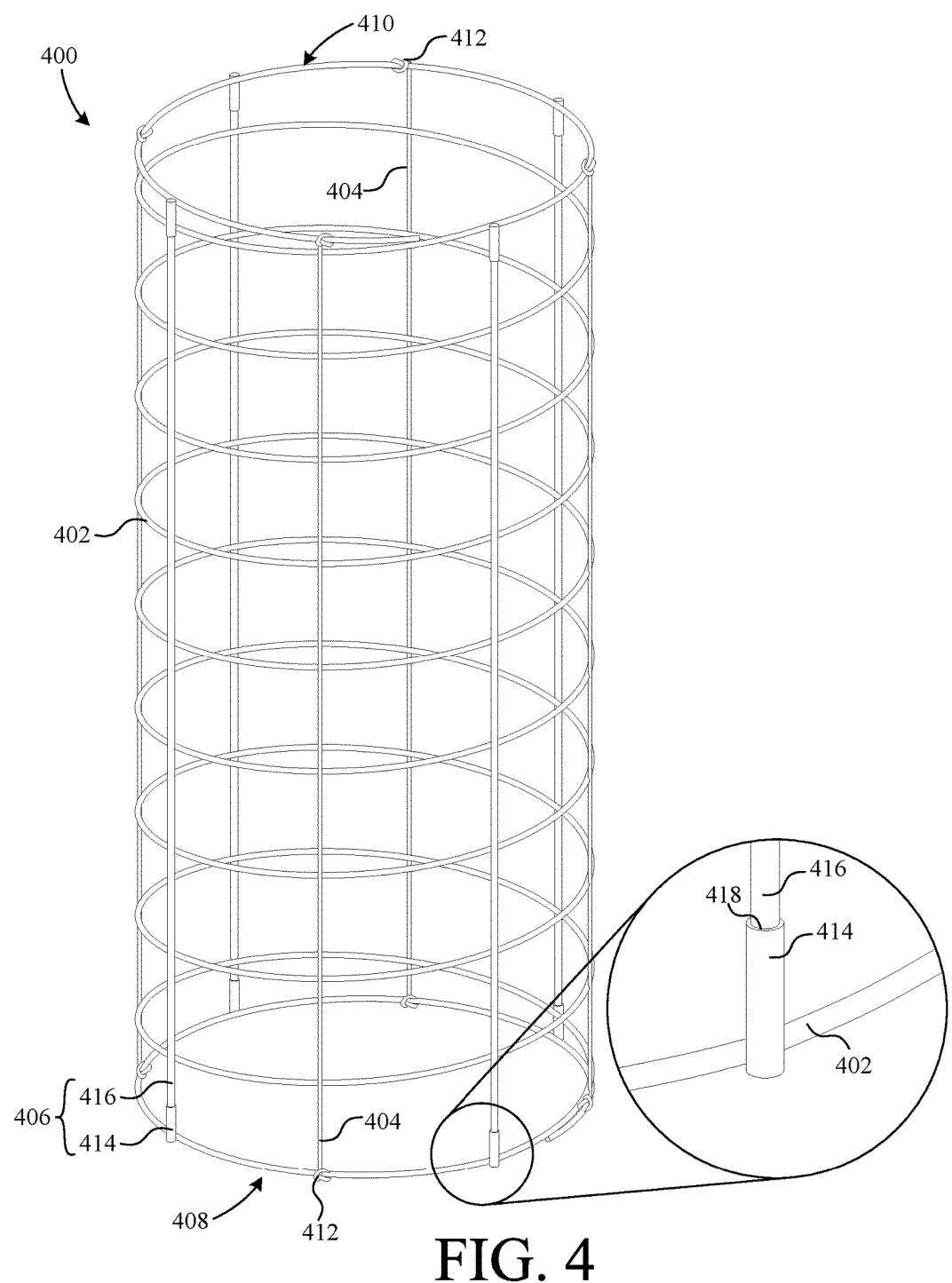
FIG. 4 is a perspective view of a plant support structure according to another embodiment of the present invention.

FIG. 4 shows a perspective view of a collapsible plant support structure 400 according to another embodiment of the present invention. Plant support structure 400 is operative to provide additional support to plants. Plant support structure 400 includes a collapsible coil 402, a plurality of vertical structures 404, and a plurality of vertical support structures 406. Collapsible coil 402 is substantially similar to coil 302 in that it is naturally in a collapsed state when not being held open by vertical support structures 406. Coil 402 includes a bottom region 408 and an opposite top region 410. Bottom region 408 is defined by a portion of coil 402 that is wound in a plane such that bottom region 408 is adapted to rest on a flat surface. In this example, vertical structures 404 are operative to limit horizontal movement of plant branches extending out of collapsible plant support structure 400, as in the previously described embodiment.

Each of vertical support structures 306 includes two coil engaging features 414 and a columnar structure 416 disposed therebetween. In this example, coil engaging features 414 are tubular rigid female couplings attached to coil 402 by some suitable means such as, for example, a tack weld. Each of coil engaging features 414 includes an open end 418 adapted to receive a respective end of a respective one of columnar structures 416. Each open end 418 is friction fit around a respective end of a respective one of columnar structures 416. Each of columnar structures 416 is a rigid pole or tube formed from some suitable material such as, for example, plastic, wood, fiberglass, etc. The rigidity and strength of columnar structures 416 is such that they do not buckle under the spring force of coil 402 and the weight of a plant growing out of collapsible plant support structure 400. In addition to providing vertical support, columnar structures 416 also provide horizontal support to plants growing from plant support structure 400. Collapsible plant support structure 400 can be stored simply by sliding columnar structures 416 out of open ends 418 of coil engaging features 414. With coil engaging features 414 removed, coil 402 collapses down into a small form factor for storage, shipping, etc.

Figure 5:
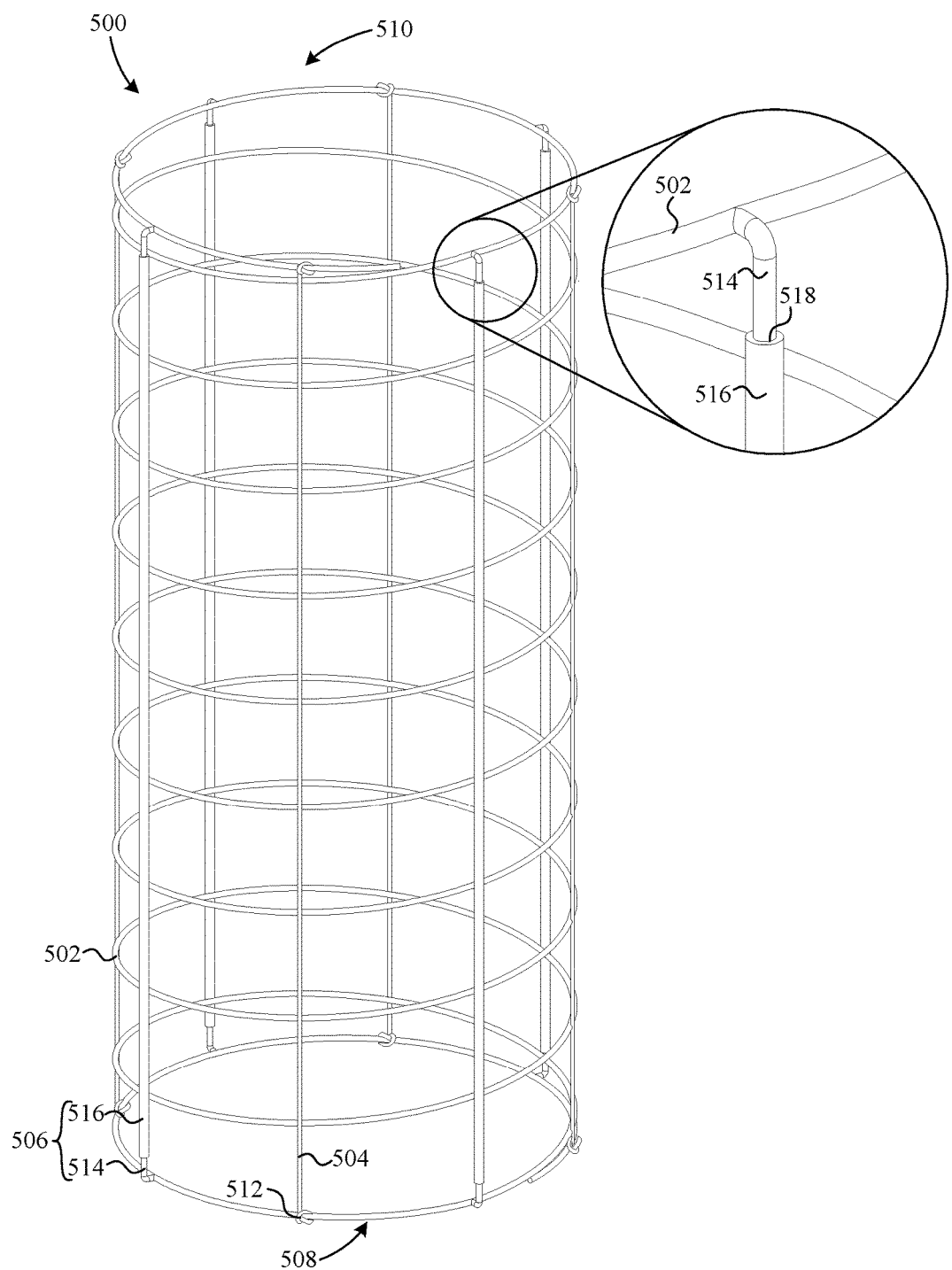
FIG. 5 is a perspective view of a plant support structure according to another embodiment of the present invention.

FIG. 5 shows a perspective view of a collapsible plant support structure 500 according to another embodiment of the present invention. Plant support structure 500 includes a collapsible coil 502, a plurality of vertical structures 504, and a plurality of vertical support structures 506. Collapsible coil 502 is substantially similar to coils 302 and 402 in that it is naturally in a collapsed state when not being held open by vertical support structures 506. Coil 502 includes a bottom region 508 and an opposite top region 510. Bottom region 508 is defined by a portion of coil 502 that is wound in a plane such that bottom region 508 is adapted to rest on a flat surface. In this example, vertical structures 504 limit horizontal movement of plant branches extending out of collapsible plant support structure 500, as in the embodiments described above.

Each of vertical support structures 506 includes two coil engaging features 514 and a columnar structure 516 disposed therebetween. In this example, coil engaging features 514 are solid wire protrusions attached to coil 502 by some suitable means such as, for example, a tack weld. Each of coil engaging features 514 is adapted to be inserted into a respective open end 518 of a respective one of columnar structures 516. Each of columnar structures 516 is a rigid tube formed from some suitable material such as, for example, plastic, metal, fiberglass, etc. The rigidity and strength of columnar structures 516 is such that they do not buckle under the spring force of coil 502 and the weight of a plant growing out of collapsible plant support structure 500. In addition to providing vertical support, columnar structures 516 also provide horizontal support to plants growing from plant support structure 500. Collapsible plant support structure 500 can be stored simply by sliding coil engaging features 514 out of open ends 518 of columnar structures 516. With coil engaging features 514 removed, coil 502 collapses down into a small form factor for storage, shipping, etc.

Figure 6:
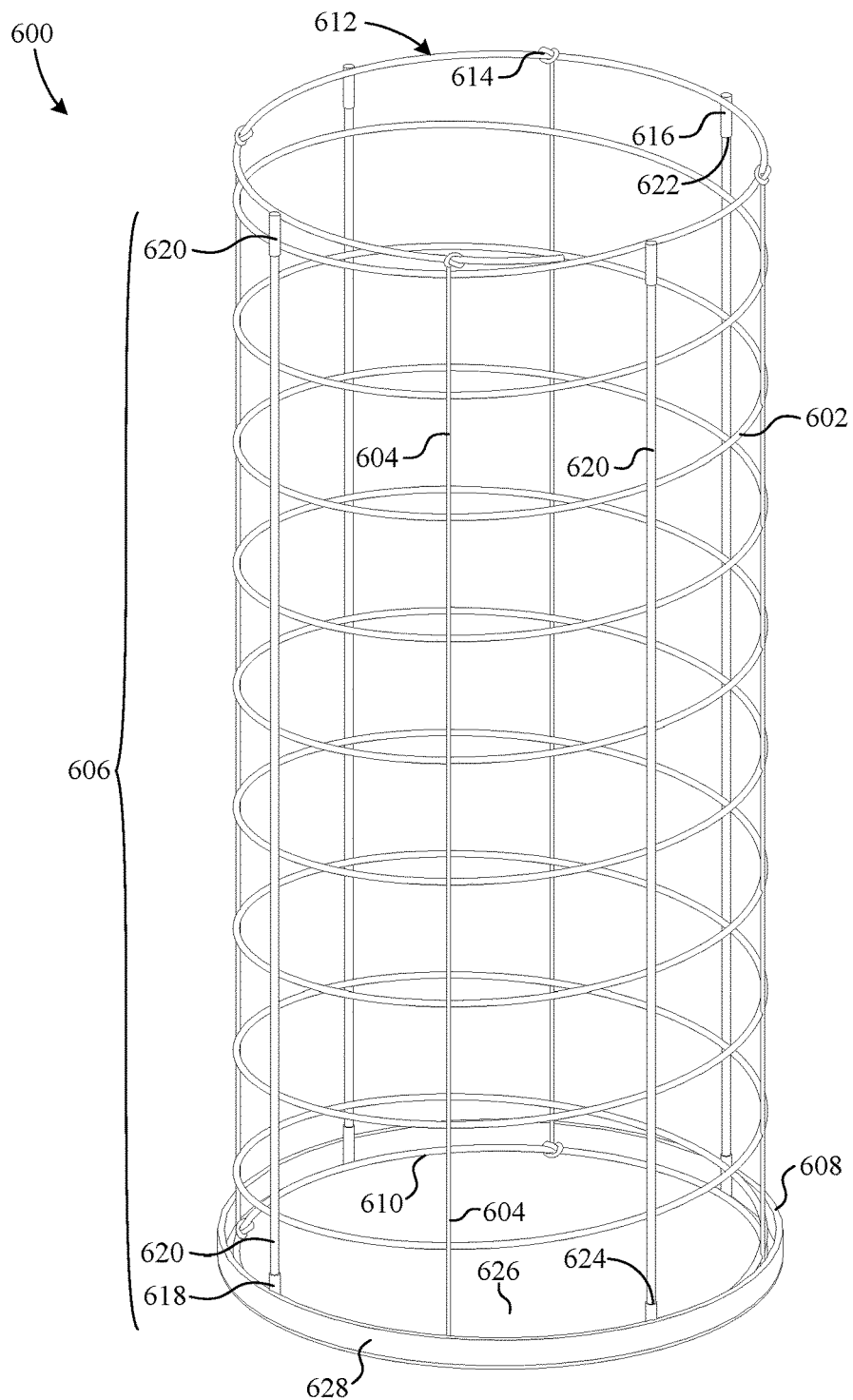
FIG. 6 is a perspective view of a plant support structure according to another embodiment of the present invention.

FIG. 6 shows a perspective view of a collapsible plant support structure 600 according to another embodiment of the present invention. Plant support structure 600 provides additional support to plants as well as preventing water and/or soil from falling onto the underlying floor. In addition, plant support structure 600 derives additional stability from the weight of a potted plant (not shown) placed with plant support structure 600. Plant support structure 600 includes a collapsible coil 602, a plurality of vertical structures 604, a plurality of vertical support structures 606, and a plant receptacle receiving element 608.

Collapsible coil 602 is substantially similar to coils 302, 402, and 502 in that it is naturally in a collapsed state when not being held open by vertical support structures 606. Coil 602 includes a bottom region 610 and an opposite top region 612. Bottom region 610 is defined by a portion of coil 602 that is wound in a plane such that bottom region 610 is adapted to rest on a flat surface. Optionally, the bottom region 610 of coil 602 can be rigidly fastened to plant receptacle receiving element 608. Vertical structures 604 limit horizontal movement of plant branches extending out of collapsible plant support structure 600.

Each of vertical support structures 606 includes a first coil engaging feature 616, columnar structure engaging feature 618, and a columnar structure 620 disposed therebetween. In this example, each of first coil engaging features 616 is a tubular rigid female couplings attached to top region 612 of coil 602. Each of first coil engaging features 616 includes an open end 622 adapted to receive a respective bottom end of a respective one of columnar structures 620. Each of columnar structure engaging feature 618 is a tubular rigid female couplings attached to plant receptacle receiving element 608 (stabilizing base). Each of columnar structure engaging features 618 include an open end 624 adapted to receive a respective bottom end of a respective one of columnar structures 620. Each of columnar structures 620 is a rigid pole or tube formed from some suitable material such as, for example, plastic, wood, fiberglass, etc. The rigidity and strength of columnar structures 620 is such that they do not buckle under the spring force of coil 602 and the weight of a plant growing out of collapsible plant support structure 600. In addition to providing vertical support, columnar structures 620 also provide horizontal support to plants growing from plant support structure 600.

Plant receptacle receiving element 608 is, for example, a rigid pan having bottom wall 626 and a cylindrical sidewall 628 extending upward therefrom. As shown, columnar structure engaging features 618 are rigidly attached to the inside of cylindrical sidewall 628. Plant receptacle receiving element 608 provides several advantages including preventing soil and/or water from falling onto the underlying floor. As another example advantage, plant receptacle receiving element 608 prevents coil 602 from tipping because the weight of the bucket rests on bottom wall 626, thereby providing a stabilizing base for collapsible plant support structure 600.

Although not shown, the vertical height of cylindrical sidewall 628 can be tall enough that coil 602 can be collapsed completely inside of plant receptacle receiving element 608. This is beneficial in that several collapsible plant support structures 600 can be stacked efficiently when packaged or just when being stored and/or shipped. In other words, when in the collapsed position, collapsible plant support structure 600 would have the same form factor as plant receptacle receiving element 608. Furthermore, columnar structures 620 can be collapsible so that each of columnar structures 620 could also be stored in plant receptacle receiving element 608 during storage and/or shipping of collapsible plant support structure 600.

Figure 7:
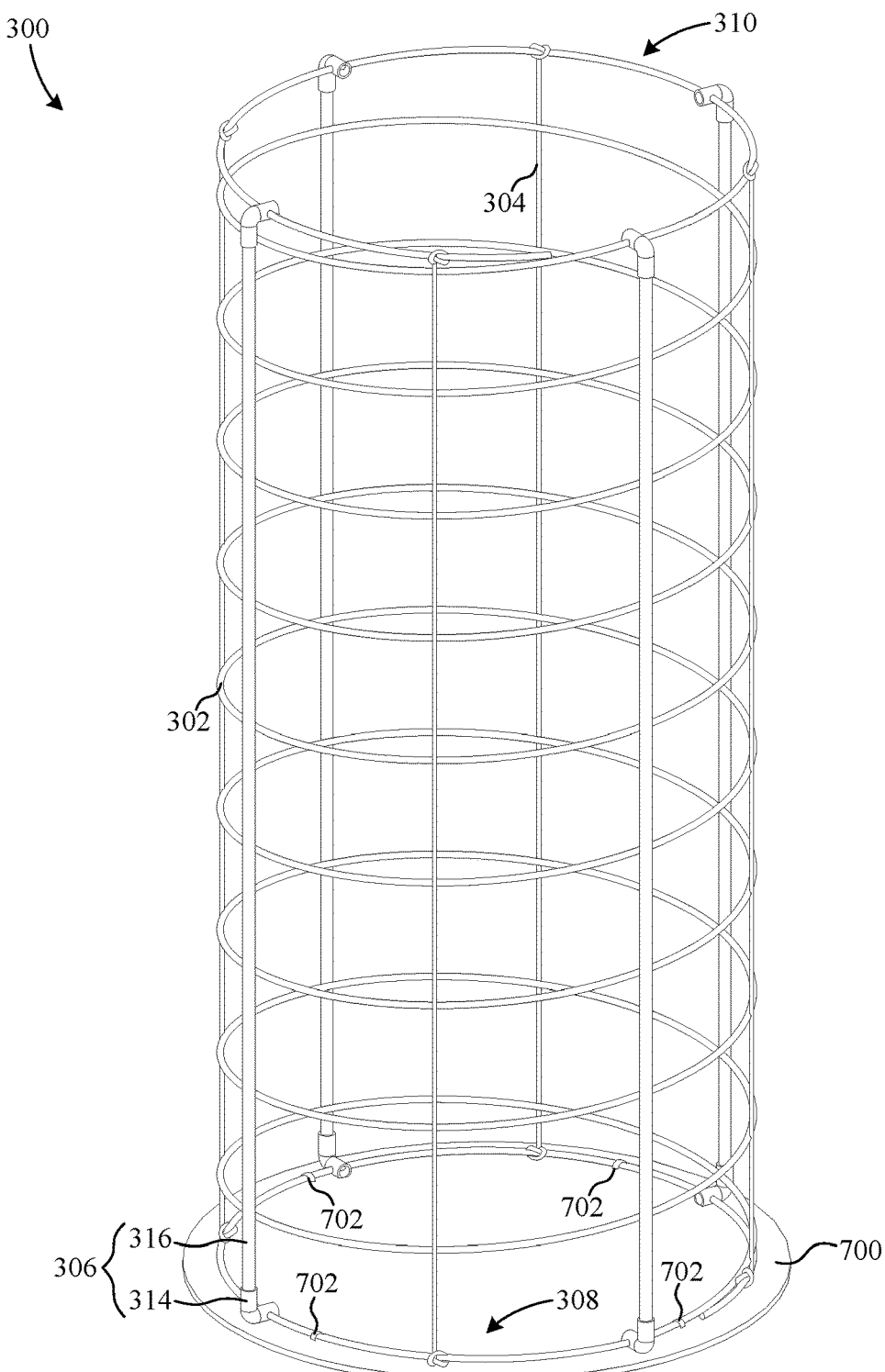
FIG. 7 is a perspective view of the plant support structure of FIG. 3 according to another embodiment of the present invention.

FIG. 7 shows a perspective view of collapsible plant support structure 300 (FIG. 3) in combination with a stabilizing base. In particular, plant support structure 300 is fixed to a plant receptacle receiving element 700. In this example, plant receptacle receiving element 700 is a flat plate that is coupled to bottom region 308 of coil 302 via a set of fasteners 702 (e.g., zip-tie, metal wire, etc.). Optionally, element 700 can be directly fixed to bottom region 308 of coil 302 by, for example, welding or an adhesive. During use, a plant receptacle (i.e. bucket) rests on plant receptacle receiving element 700, which provides stability to plant support structure 300. Indeed, plant support structure 300 is much more difficult to tip under the weight of a plant when the weight of the plant receptacle is resting on plant receptacle receiving element 700. Plant receptacle receiving element 700 can be constructed out of any suitable material including, but not limited to, wood, plastic, and/or metal, that is capable of transferring weight from a potted plant to the bottom region 308 of coil 302.

Figure 8:
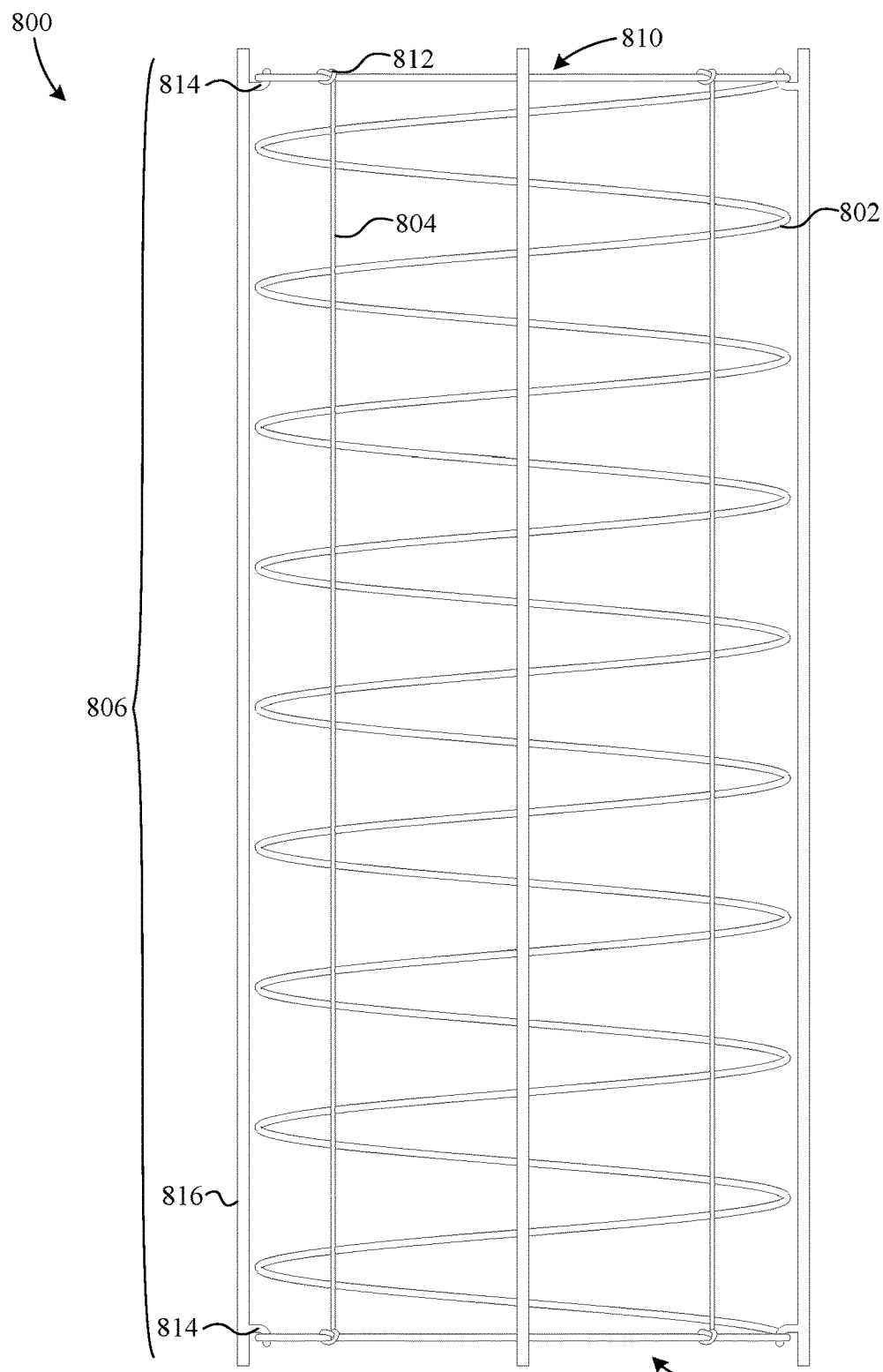
FIG. 8 is a side view of a plant support structure according to another embodiment of the present invention.

FIG. 8 shows a side view of a collapsible plant support structure 800 according to another embodiment of the present invention. Plant support structure 800 includes a collapsible coil 802, a plurality of vertical structures 804, and a plurality of vertical support structures 806. Collapsible coil 802 is substantially similar to coils 302, 402, 502, and 602 in that it is naturally in a collapsed state when not being held open by vertical support structures 806. Coil 802 includes a bottom region 808 and an opposite top region 810. Bottom region 808 is defined by a portion of coil 802 that is wound in a plane. Vertical structures 804 are formed from individual pieces of string that are each tied into knots 812 attached to both bottom region 808 and top region 810. Each of vertical support structures 806 includes two coil engaging features 814 and a columnar structure 816 disposed therebetween. In this example, coil engaging features 814 are outward facing hooks that engage both bottom region 808 and top region 810 of coil 802. Each of columnar structures 816 is a rigid column structure formed from some suitable material such as, for example, plastic, metal, fiberglass, wood, etc. Collapsible plant support structure 800 can be broken down for storage simply by disengaging bottom region 808 and top region 810 from coil engaging features 814. With coil engaging features 814 disengaged, coil 802 collapses down into a small form factor for storage, shipping, etc.

Figure 9:
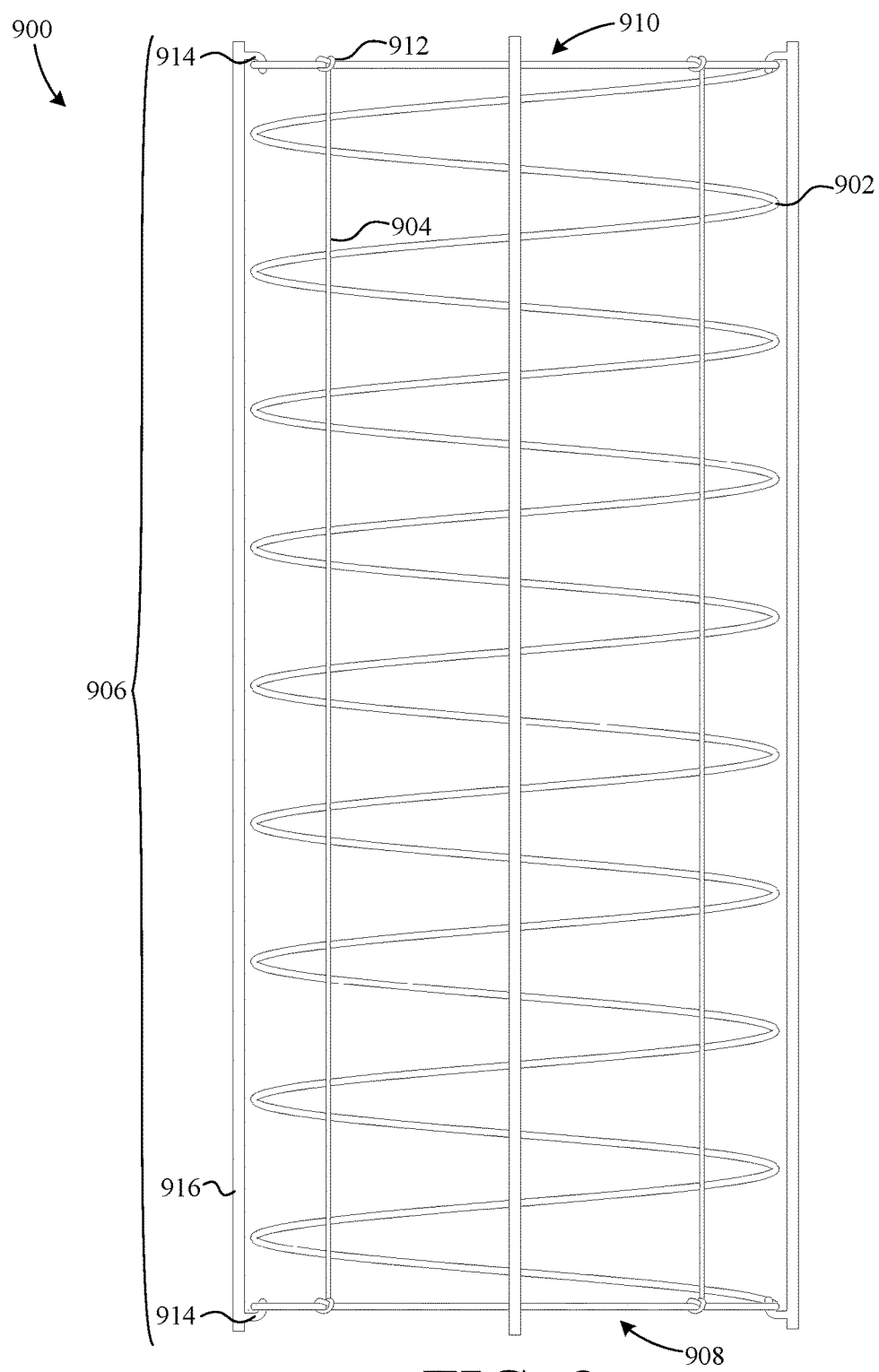
FIG. 9 is a side view of a plant support structure according to another embodiment of the present invention.

FIG. 9 shows a side view of a collapsible plant support structure 900 according to another embodiment of the present invention. Plant support structure 900 includes a collapsible coil 902, a plurality of vertical structures 904, and a plurality of vertical support structures 906. Collapsible coil 902 is substantially similar to coil 200 in that it is naturally in an open position when not engaged by vertical support structures 906. Coil 902 includes a bottom region 908 and an opposite top region 910. Bottom region 908 is defined by a portion of coil 902 that is wound in a plane. Vertical structures 904 are formed from individual pieces of string that are each tied into knots 912 attached to both bottom region 908 and top region 910. Each of vertical support structures 906 includes two coil engaging features 914 and a columnar structure 916 disposed therebetween. In this example, coil engaging features 914 are inward facing hooks that engage both bottom region 908 and top region 910 of coil 902. Each of columnar structures 916 is a rigid column structure. Collapsible plant support structure 900 can be broken down for storage simply by disengaging bottom region 908 and top region 910 from coil engaging features 914, compressing coil 902, and then fastening coil 902 in a compressed position by some suitable means such as hook-and-loop fasteners.

Figure 10:
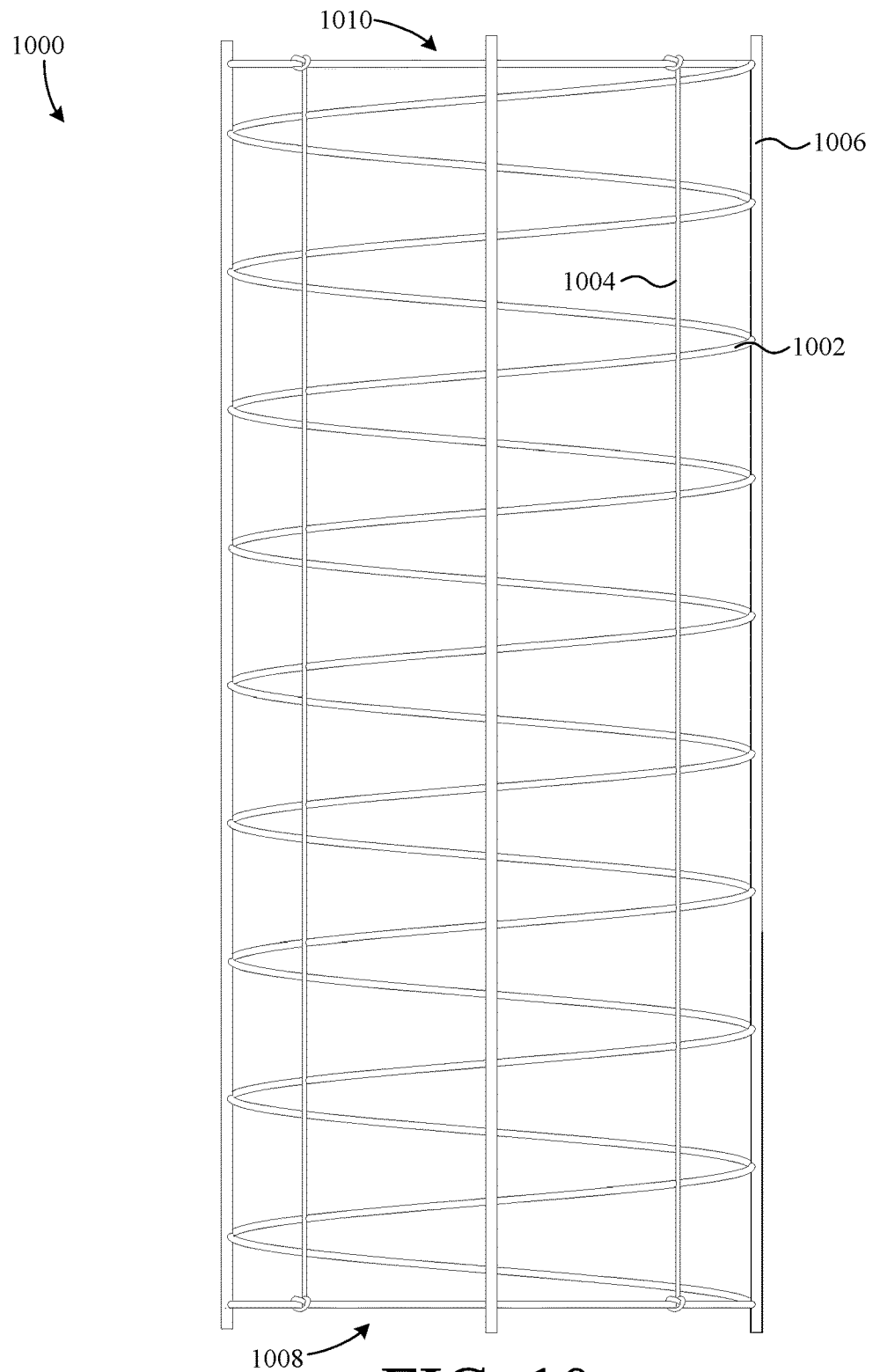
FIG. 10 is a side view of a plant support structure according to another embodiment of the present invention.

FIG. 10 shows a side view of a collapsible plant support structure 1000 according to another embodiment of the present invention. Plant support structure 1000 includes a collapsible coil 1002, a plurality of vertical structures 1004, and a plurality of vertical support structures 1006. Collapsible coil 1002 includes a bottom region 1008 and an opposite top region 1010. Bottom region 1008 is defined by a portion of coil 1002 that is wound in a plane. Vertical structures 1004 are formed from individual pieces of string that are each tied into knots 1012 attached to both bottom region 1008 and top region 1010. Each of vertical support structures 1006 is removably coupled to coil 1002 and restrains coil 1002 in a deployed position.

Figure 11:
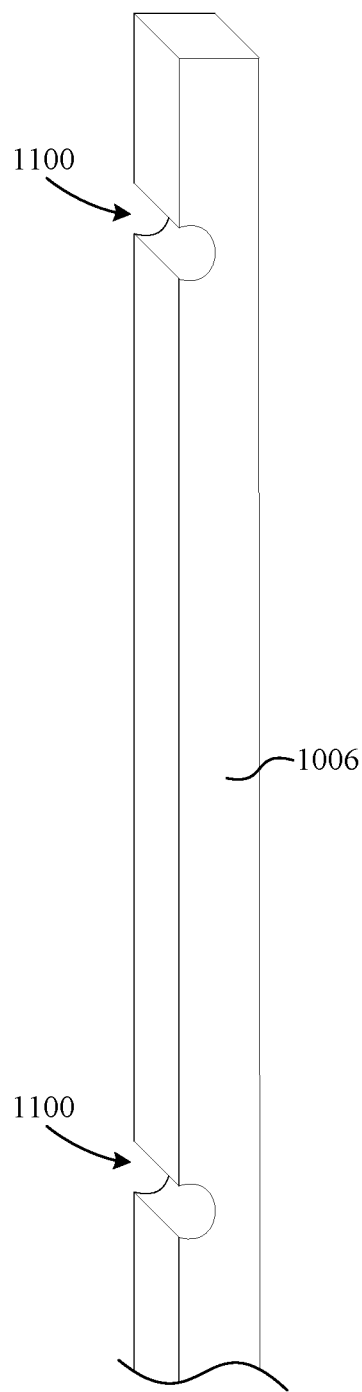
FIG. 11 is a perspective view of a vertical support structure of the plant support structure of FIG. 10.

FIG. 11 shows a perspective view of a portion of one of vertical support structures 1006 removed from coil 1002. As shown, each of vertical support structures 1006 is a columnar structure having a plurality of coil engaging features 1100 formed therein. Coil engaging features 1100 are notches contoured to engage coil 1002 at multiple locations, including the top, bottom, and intermediate turns of coil 1002. When coil 1002 is engaged within coil engaging features 1100, coil 1002 is not free to move in the vertical direction. Therefore, the natural state of coil 1002 (either compressed or open) is irrelevant to the design of plant support structure 1000. Indeed, coil 1002 can be of either a naturally compressed or naturally decompressed type.

Figure 12:
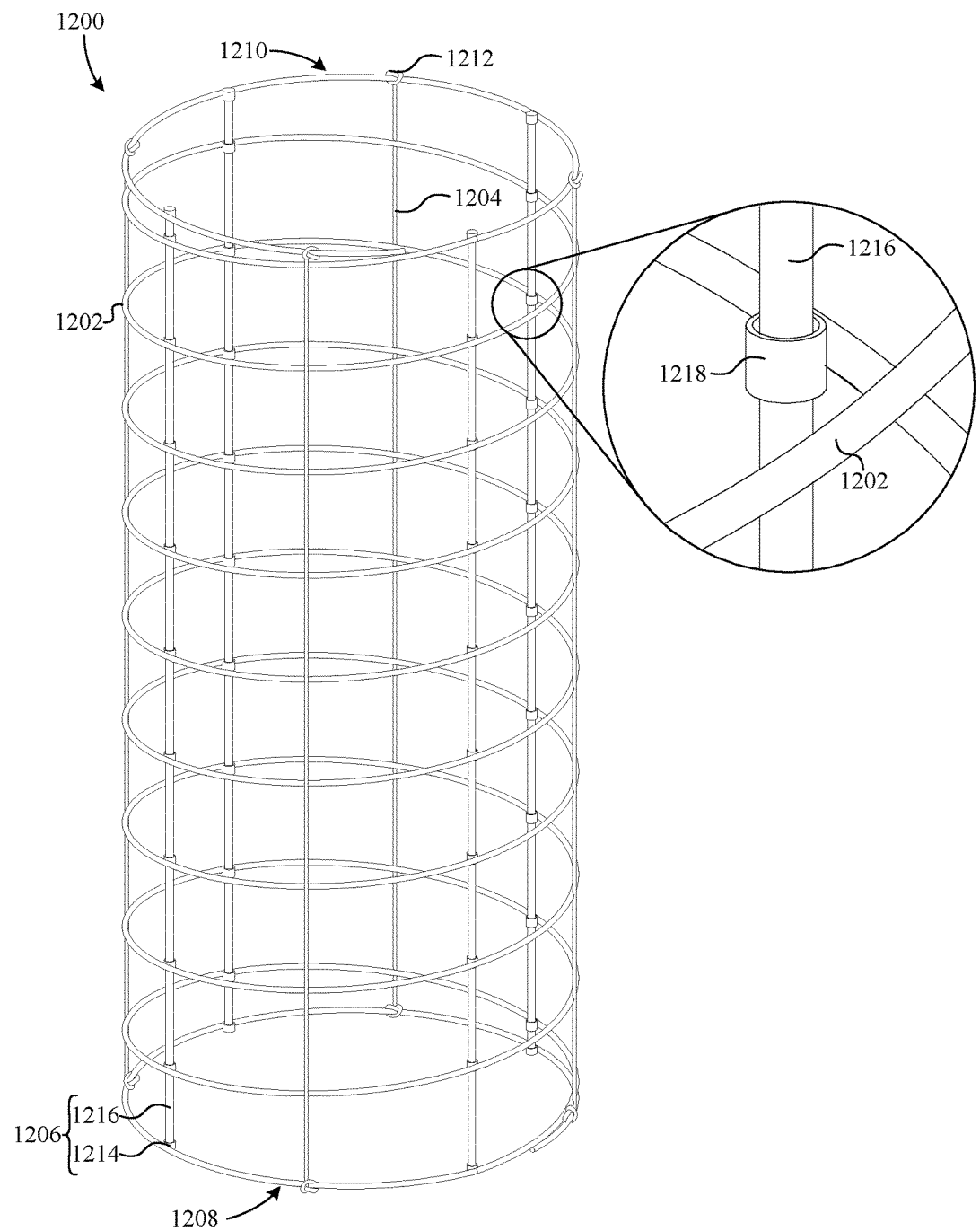
FIG. 12 is a perspective view of a plant support structure according to another embodiment of the present invention.

FIG. 12 shows a perspective view of a collapsible plant support structure 1200 according to another embodiment of the present invention. Plant support structure 1200 includes a collapsible coil 1202, a plurality of vertical structures 1204, and a plurality of vertical support structures 1206. Collapsible coil 1202 is substantially similar to coils 302, 402, 502, 602, and 802 in that it is naturally in a collapsed position when not engaged by vertical support structures 1206. Coil 1202 includes a bottom region 1208 and an opposite top region 1210. Bottom region 1208 is defined by a portion of coil 1202 that is wound in a plane.

Vertical structures 1204 are formed from individual pieces of string that are each tied into knots 1212 attached to both bottom region 1208 and top region 1210.

Each of vertical support structures 1206 includes two coil engaging features 1214, a columnar structure 1216, and a plurality of annular elements 1218. In this example, coil engaging features 1214 are cylindrical end caps attached to bottom region 1208 and top region 1210 of coil 1202 by some suitable means (e.g. spot weld). Each of coil engaging features 1214 is adapted to receive a respective end of a respective one of columnar structures 1216. Each of columnar structures 1216 is a rigid column structure held in place by the natural tendency of coil 1202 to compress. Each annular element 1218 is adapted to slidably engage the exterior surface of columnar structures 1216. Furthermore, each of annular elements is a metal ring attached to coil 1202 by some suitable means such as, for example, a tack weld. Annular elements 1218 increase the number of inflection points of columnar structures 1216 thereby substantially increasing the force columnar structure 1216 is capable of supporting before buckling. Collapsible plant support structure 1200 can be broken down for storage simply by removing columnar structures 1216 from coil engaging features 1214 and sliding them out of annular elements 1218. With columnar structures 1216 removed, coil 1202 is able to compress thereby having a substantially smaller form factor.

Figure 13:
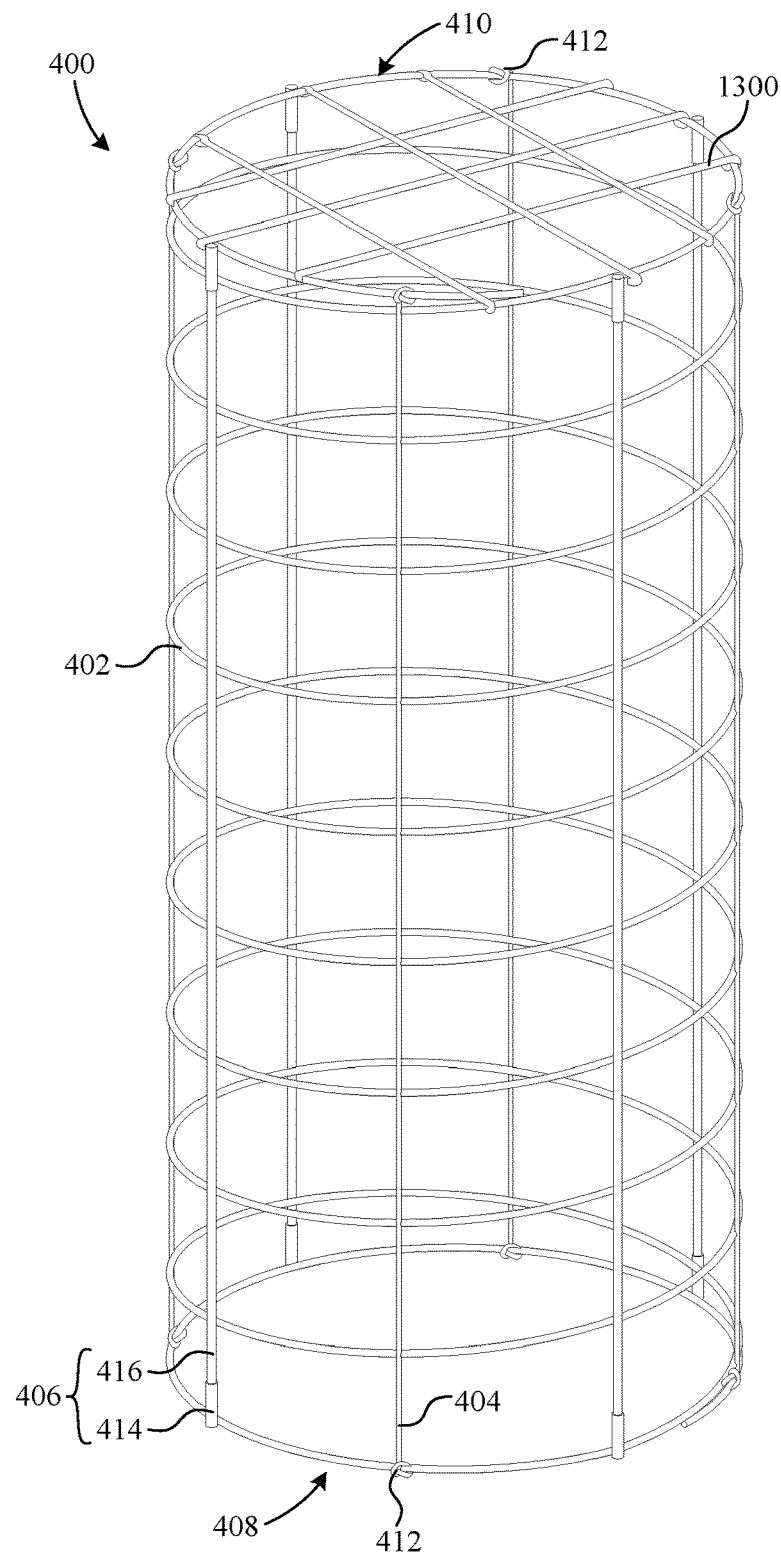
FIG. 13 is a perspective view of the plant support structure of FIG. 4 according to another embodiment of the present invention.

FIG. 13 shows a perspective view of collapsible plant support structure 410 (FIG. 4) in combination with another feature of the present invention. In this example, plant support structure 410 additionally includes a grid structure 1300 coupled to top region 410 of coil 402. Grid structure 1300 is a removable structure that can be optionally used to provide additional support to both plant support structure 410 and plants growing therefrom. Grid structure 1300 can be formed a variety of different ways. For example, grid structure 1300 can be a wire mesh structure or a grid of elastic cords.

Figure 14:
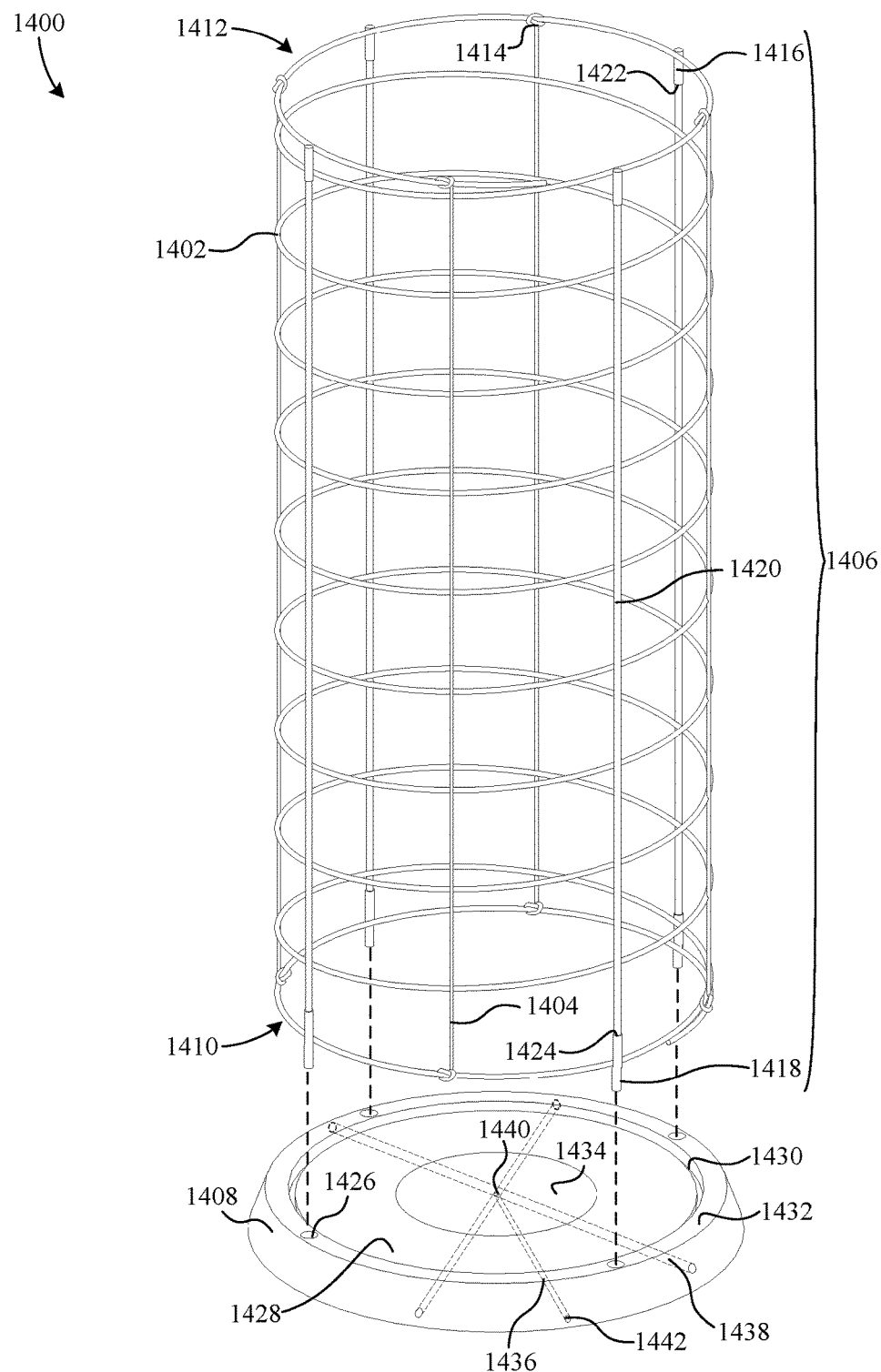
FIG. 14 is a perspective view of a plant support structure according to another embodiment of the present invention.

FIG. 14 shows a perspective view of a collapsible plant support structure 1400 according to another embodiment of the present invention. Plant support structure 1400 includes a collapsible coil 1402, a plurality of vertical structures 1404, a plurality of vertical support structures 1406, and a plant receptacle receiving element 1408.

Collapsible coil 1402 is substantially similar to coils 302, 402, 502, 602, 802, and 1202 in that it is naturally in a collapsed state when not being held open by vertical support structures 1406. Coil 1402 includes a bottom region 1410 and an opposite top region 1412. Bottom region 1410 is defined by a portion of coil 1402 that is wound in a plane such that bottom region 1410 is adapted to rest on a flat surface.

In this example, vertical structures 1404 are formed from individual pieces of string that are each tied into knots 1414 attached to both bottom region 1410 and top region 1412.

Each of vertical support structures 1406 includes a first coil engaging feature 1416, a second coil engaging feature 1418, and a columnar structure 1420 disposed therebetween. In this example, each of first coil engaging features 1416 is a tubular rigid female couplings attached to top region 1412 of coil 1402. Each of first coil engaging features 1416 includes an open end 1422 adapted to receive a respective top end of a respective one of columnar structures 1420. Each of second coil engaging features 1418 is a tubular rigid female couplings attached to bottom region 1410 of coil 1402. Each of second coil engaging features 1418 includes an open end 1424 that is adapted to receive a respective bottom end of a respective one of columnar structures 1420. Each of second coil engaging features 1418 is also adapted to fit into a respective set of cylindrical apertures 1426 formed in plant receptacle receiving element 1408.

Plant receptacle receiving element (stabilizing base) 1408 is, for example, a molded plastic structure that includes a flat surface 1428, an annular channel 1430, a sidewall 1432, a pitched surface 1434, a drain duct 1436, and a watering duct network 1438. Flat surface 1428 is adapted to support a plant receiving receptacle such as, for example, a bucket. Annular channel 1430 is adapted to seat bottom region 1410 of coil 1402 therein. Sidewall 1432 extends upward and defines apertures 1426. Pitched surface 1434 enables water that falls onto plant receptacle receiving element 1408 to move to drain duct 1436. Drain duct 1436 includes an inlet 1440 and an outlet 1442 formed on pitched surface 1434 and sidewall 1432, respectively. Watering duct network 1438 enables multiple plant receptacle receiving elements 1408 to be connected to a single water source or any desirable fluid network.

Figure 15:
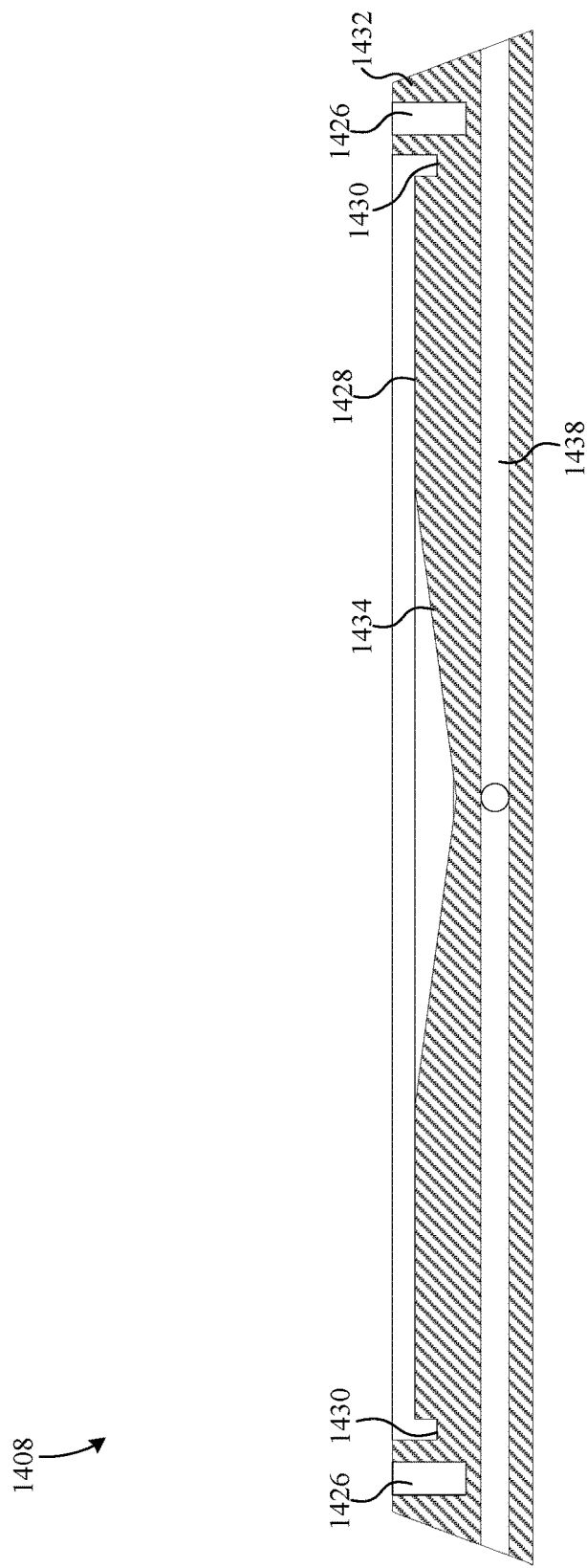
FIG. 15 is a cross-sectional side view of a plant receptacle receiving element of the plant support structure of FIG. 1400.

FIG. 15 shows a cross-sectional side view of plant receptacle receiving element 1408. As shown, apertures 1426 extend only partially into plant receptacle receiving element 1408 so as to support vertical support structures 1406 in an upright position. Watering duct network 1438 is formed from two perpendicular ducts passing entirely through plant receptacle receiving element 1408.

Figure 16:
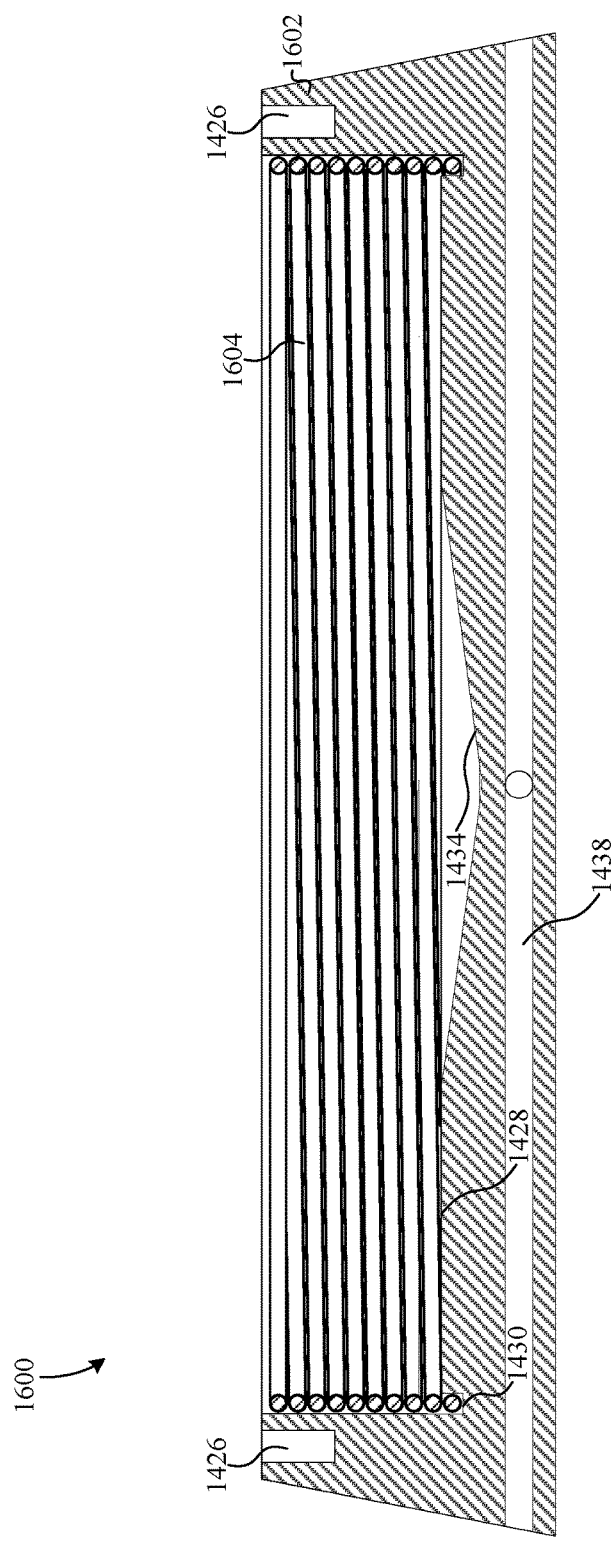
FIG. 16 is a cross-sectional view of a plant receptacle receiving element according to another embodiment of the present invention.

FIG. 16 shows a cross-sectional side view of plant receptacle receiving element 1600 according to an alternate embodiment of the present invention. The features of plant receptacle receiving element 1600 are substantially similar to plant receptacle receiving element 1408. Therefore, features of plant receptacle receiving element 1600 that are substantially identical to those of plant receptacle receiving element 1408 will we referenced with like numbers. The only difference between plant receiving element 1600 and 1408 is that receptacle receiving element 1600 includes a sidewall 1602 that is much taller than sidewall 1432. The height of sidewall 1602 is such that a coil 1604 can fit entirely within the form factor of plant receptacle receiving element 1600 when collapsed. This is particularly desirable in that it facilitates convenient storage and/or stackability of a collapsible plant support structure.

Figure 17:
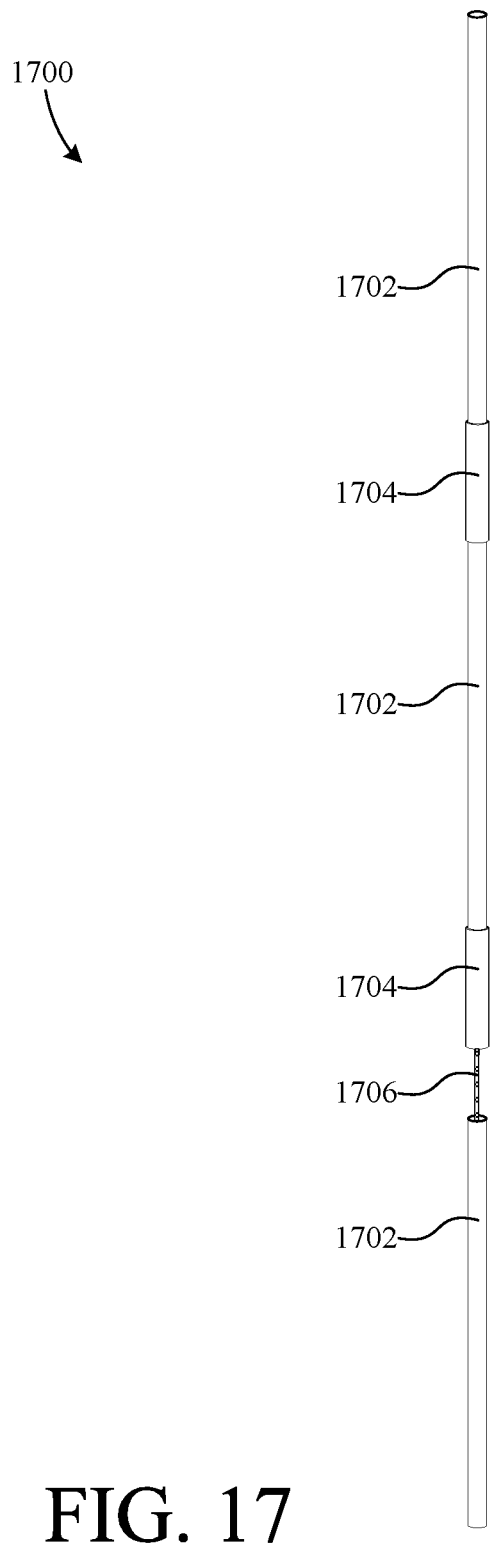
FIG. 17 is a perspective view of a collapsible vertical support structure according to another embodiment of the present invention.

FIG. 17 shows a perspective view of a columnar support structure 1700 that is capable supporting coil 1604. Columnar support structure 1700 can be collapsed down to fit within the form factor of plant receptacle receiving element 1600. As shown, columnar support structure 1700 includes three discrete tubular sections 1702 friction fit together via tubular couplings 1704. Columnar support structure 1700 further includes an elastic cord 1706 disposed in sections 1702 so as to prevent sections 1702 from being disconnected. Columnar support structure 1700 can also be substituted for the column support structures of previously described embodiments.

Figure 18:
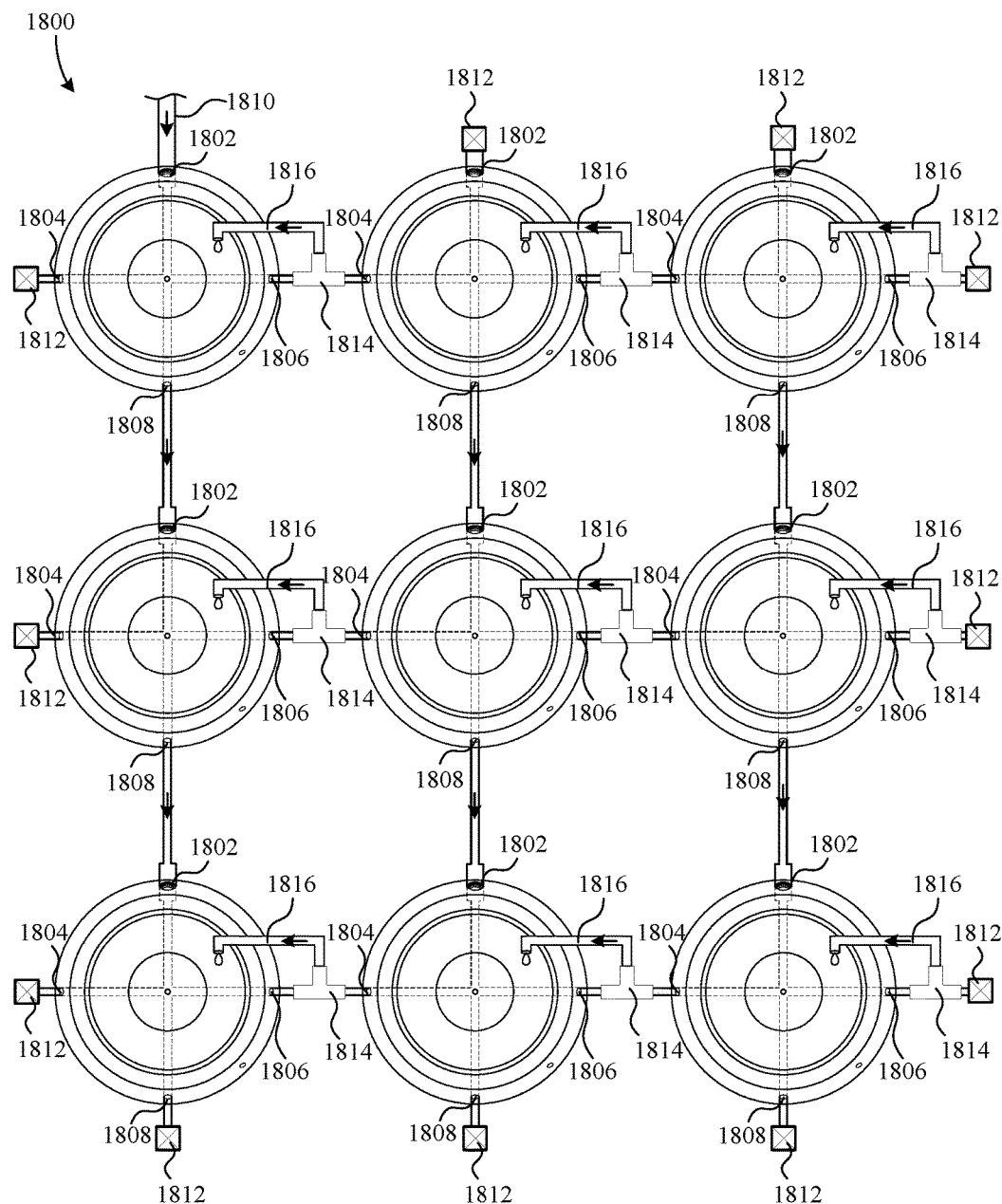
FIG. 18 is a top view of an array of plant receptacle receiving elements.

FIG. 18 shows a top view of an array 1800 of plant receptacle receiving elements $1408_{1,1}$ through $1408_{3,3}$ connected to form a fluid network. As shown, each watering duct network 1438 of respective plant receptacle receiving elements 1408 includes a top port 1802, a left port 1804, a right port 1806, and a bottom port 1808.

In this example, water is supplied to array 1800 through a single water source 1810 coupled to top port 1802 of plant receptacle receiving element $1408_{1,1}$. Left port 1804 of plant receptacle receiving elements $1408_{1,1}$ is closed via a plug 1812. Right port 1804 of plant receptacle receiving element $1408_{1,1}$ is coupled to a T-coupling 1814 so as to supply water to both a watering outlet 1816 of plant receptacle receiving element $1408_{1,1}$ and also to left port 1804 of plant receptacle receiving element $1408_{2,1}$. Bottom port 1808 supplies water directly to top port 1802 of plant receptacle receiving element $1408_{1,2}$.

Top port 1802 of plant receptacle receiving element $1408_{1,2}$ receives water supplied by bottom port 1808 of plant receptacle receiving element $1408_{1,1}$. Left port 1804 of plant receptacle receiving elements $1408_{1,2}$ is closed via a plug 1812. Right port 1804 of plant receptacle receiving element $1408_{1,2}$ is coupled to a T-coupling 1814 so as to supply water to both a watering outlet 1816 of plant receptacle receiving element $1408_{1,2}$ and also to left port 1804 of plant receptacle receiving element $1408_{2,2}$. Bottom port 1808 of plant receptacle receiving element $1408_{1,2}$ is closed via a plug 1812. However, bottom port 1808 of plant receptacle receiving element $1408_{1,2}$ could also be coupled to supply water to another plant receptacle receiving element 1408.

Top port 1802 of plant receptacle receiving element $1408_{2,1}$ is closed via a plug 1812. Left port 1804 of plant receptacle receiving elements $1408_{2,1}$ receives water supplied by right port 1806 of plant receiving element $1408_{1,1}$ through T-coupling 1814. Right port 1804 of plant receptacle receiving element $1408_{2,1}$ supplies water to a watering outlet 1816 of plant receptacle receiving element $1408_{2,1}$. Optionally, right port 1804 could be coupled to a T-coupling so as to supply water to yet another plant receptacle receiving element 1408. Bottom port 1808 of plant receptacle receiving element 1408$_{2,1}$ is coupled directly to top port 1802 of plant receptacle receiving element 1408$_{2,2}$.

Top port 1802 of plant receptacle receiving element 1408$_{2,2}$ receives water supplied by bottom port 1808 of plant receptacle receiving element 1408$_{2,1}$. Left port 1804 of plant receptacle receiving elements 1408$_{2,2}$ receives water supplied by right port 1806 of plant receptacle receiving element 1408$_{1,2}$ indirectly through a T-coupling 1814. Right port 1804 of plant receptacle receiving element 1408$_{2,2}$ supplies water to a watering outlet 1816 of plant receptacle receiving element 1408$_{2,2}$. Optionally, right port 1804 of plant receptacle receiving element 1408$_{2,2}$ could be coupled to a T-coupling so as to supply water to yet another plant receptacle receiving element 1408. Bottom port 1808 of plant receptacle receiving element 1408$_{2,2}$ is closed via a plug 1812. However, bottom port 1808 of plant receptacle receiving element 1408$_{2,2}$ could also be coupled to supply water to another plant receptacle receiving element 1408. Indeed, number and layout of plant receptacle receiving elements 1408 can be arranged according to user preference and water supply parameters (i.e., pressure, flow rate, etc.).

The manufacturing of a collapsible plant support structure 1900 is described as follows with reference to FIGS. 19A, 19B, and 19C.

Figure 19A:
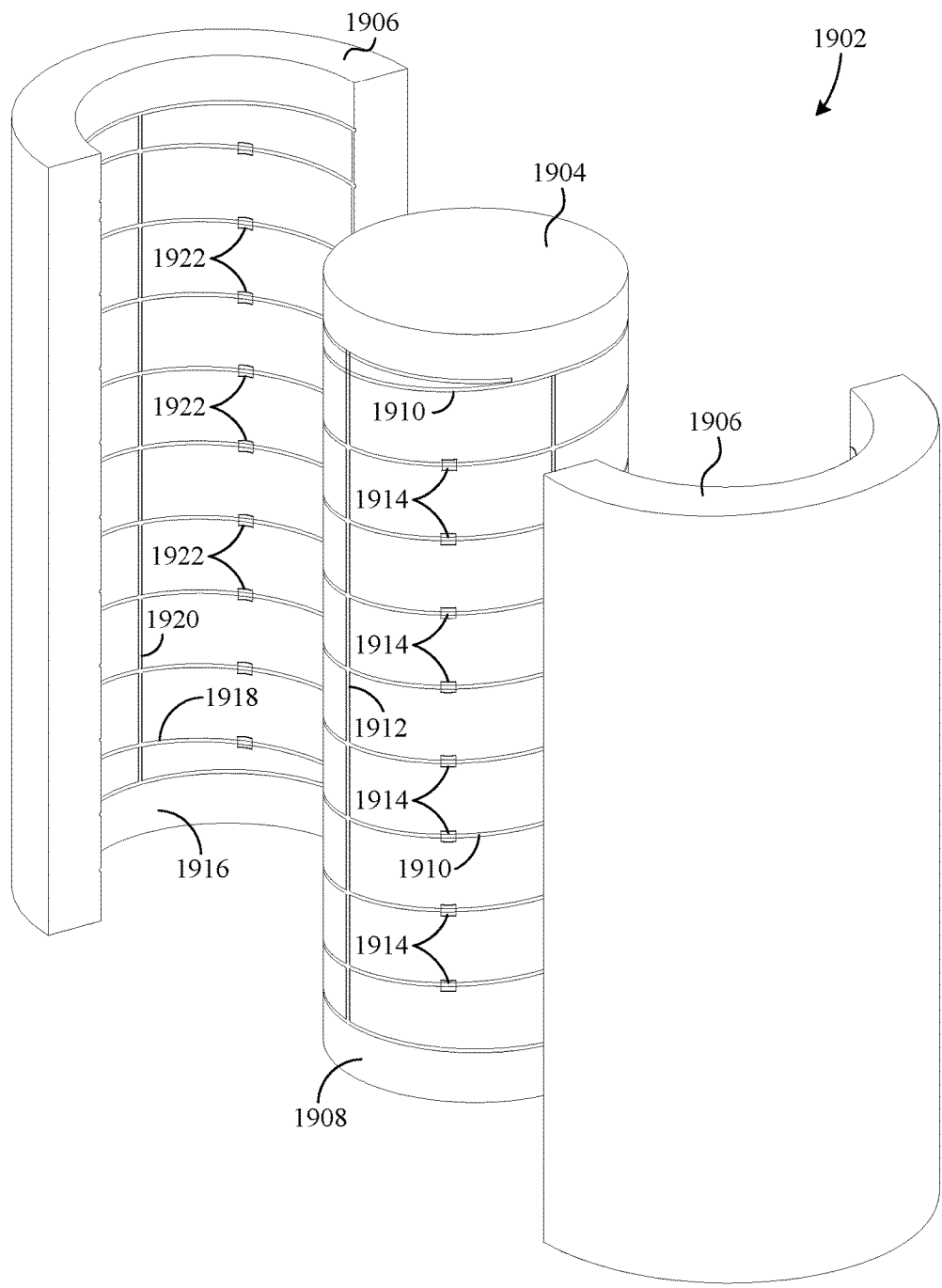
FIG. 19A is a perspective view of an insert mold in an open position.

In a first step illustrated in FIG. 19A, an insert mold 1902 is provided. Insert mold 1902 includes a center 1904 and two sides 1906. Mold center 1904 includes an exterior surface 1908 defining a helical channel 1910, a set of vertical channels 1912, and a set ring cavities 1914. Similarly, mold sides 1906 include interior surfaces 1916 each defining a complimentary helical channel 1918, a complimentary set of vertical channels 1920, and a complimentary set of ring cavities 1922.

In a second step, a metal coil 1924 (shown in FIG. 20) is placed into mold 1902 as an insert. That is, coil 1924 is seated in helical channel 1910 of mold center 1904.

Figure 19B:
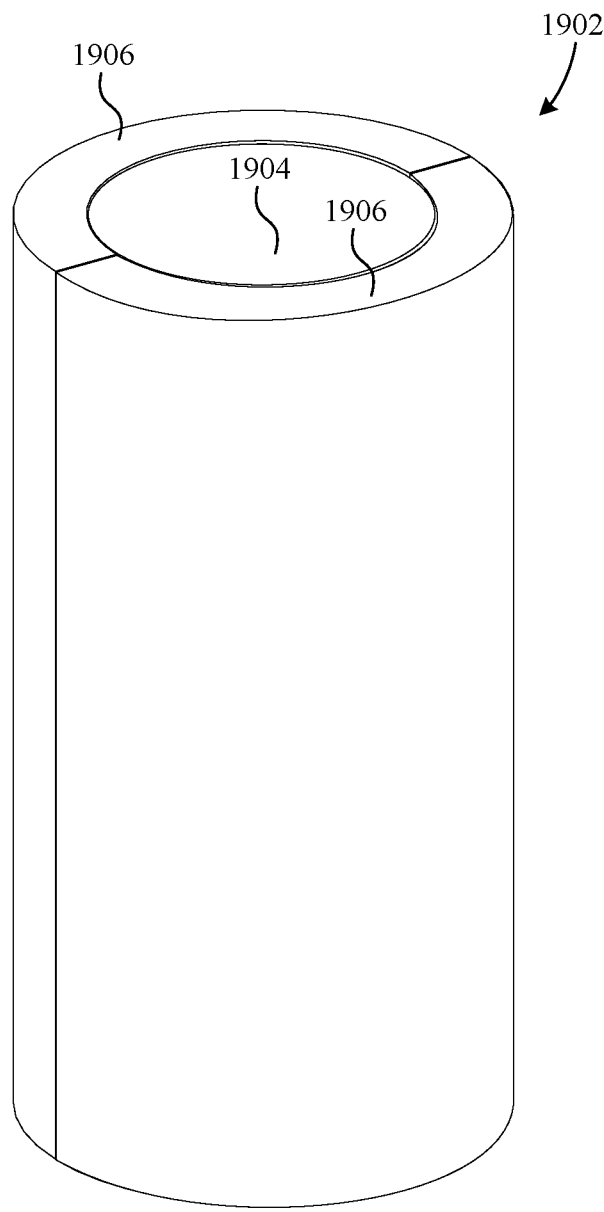
FIG. 19B is a perspective view of the insert mold of FIG. 19A in a closed position.
Figure 19C:
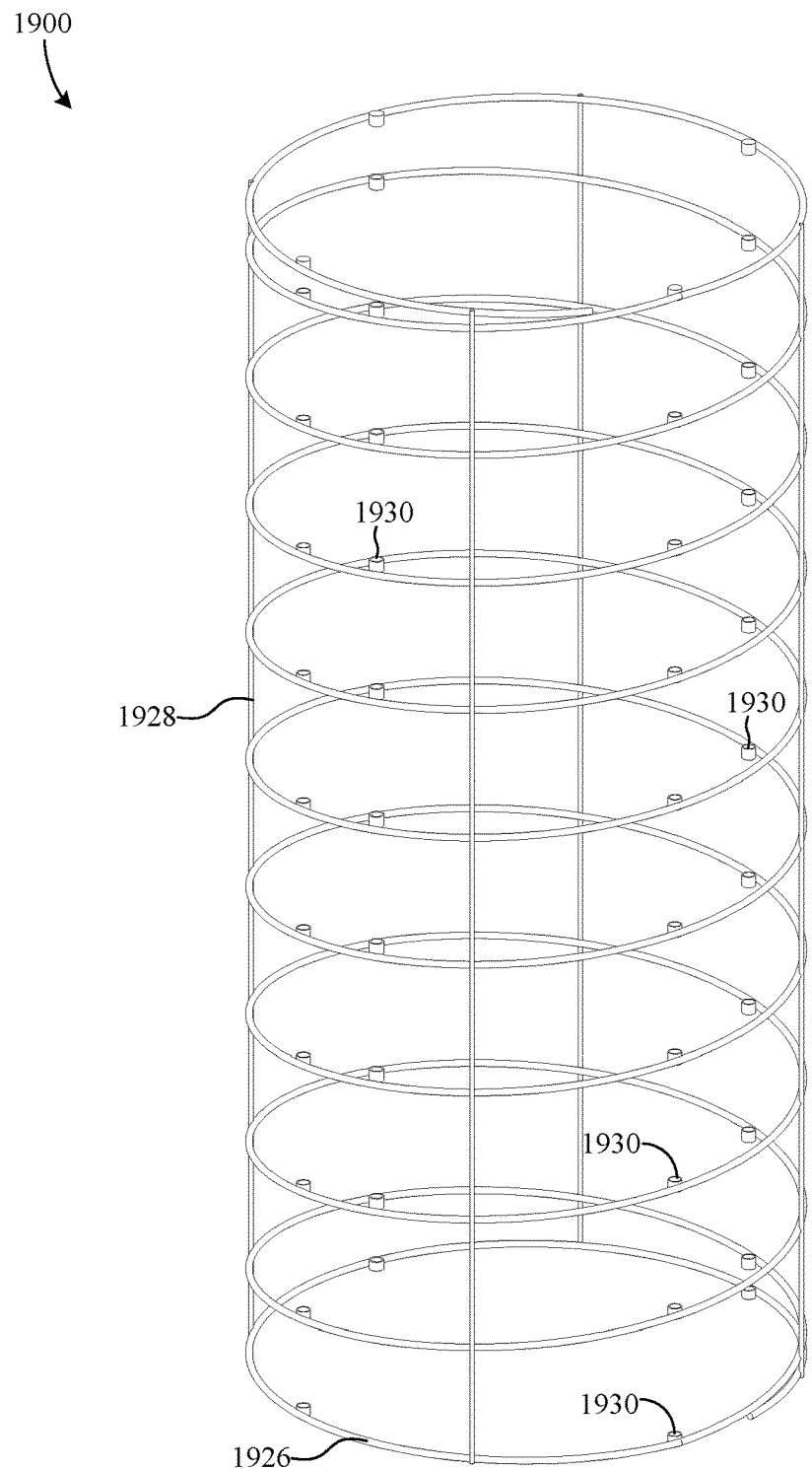
FIG. 19C is a perspective view of a collapsible plant support structure formed in the mold of FIG. 19A.

In a third step, depicted in FIG. 19B, mold 1902 is closed with coil 1924 seated in helical channel 1910. When mold 1902 is closed, helical channel 1910 and complimentary helical channel 1918 form a helical cavity that has an inner diameter slightly larger than the outer diameter of coil 1924. When resin in injected into the helical cavity formed by helical channel 1910 and complimentary helical channel 1918, a resin shell 1926 (shown in FIG. 19C and FIG. 20) is formed around coil 1924. Furthermore, when mold 1902 is closed, vertical channels 1912 and 1920 align to form four vertical bores that intersect the helical cavity formed by helical channels 1912 and 1918. When resin (e.g., rubber, plastic, etc.) is injected into the vertical bores formed by vertical channels 1912 and 1920, vertical structures 1928 (shown in FIG. 19C) attached to shell 1926 are formed. When mold 1902 is closed, ring cavities 1914 and complimentary ring cavities 1922 also align to form a ring shaped cavity. When resin is injected into the ring shaped cavities, a plurality of ring features 1930 (shown in FIG. 19C and FIG. 20) are integrally formed on resin shell 1926.

Once the injected resin is sufficiently cooled, mold 1902 is opened and collapsible plant support 1900 (shown in FIG. 19C) is removed from mold center 1904. Collapsible plant support 1900 includes resin coated metal coil 1924, a plurality vertical structures 1928 composed of resin, and a plurality of ring features 1930 composed of resin.

The functionality of collapsible plant support structure 1900 is substantially similar to that of collapsible plant support structure 1200. Therefore, redundant descriptions of plant support structure 1900 and like components are not provided for the sake of brevity. Although not shown, collapsible plant support structure 1900 also includes four vertical support structures 1216 to hold collapsible plant support structure 1900 in an open position. Depending on the type of support structures used, additional coil engaging features (not shown) can be provided by mold 1902.

Although not shown, fold lines or features can be molded into vertical structures 1928 (e.g., halfway between each turn of coil 1924). The fold lines effectively cause each intermediate region of vertical structures 1928 between each turn of coil 1924 to collapse inward when coil 1924 is collapsed downward.

Figure 20:
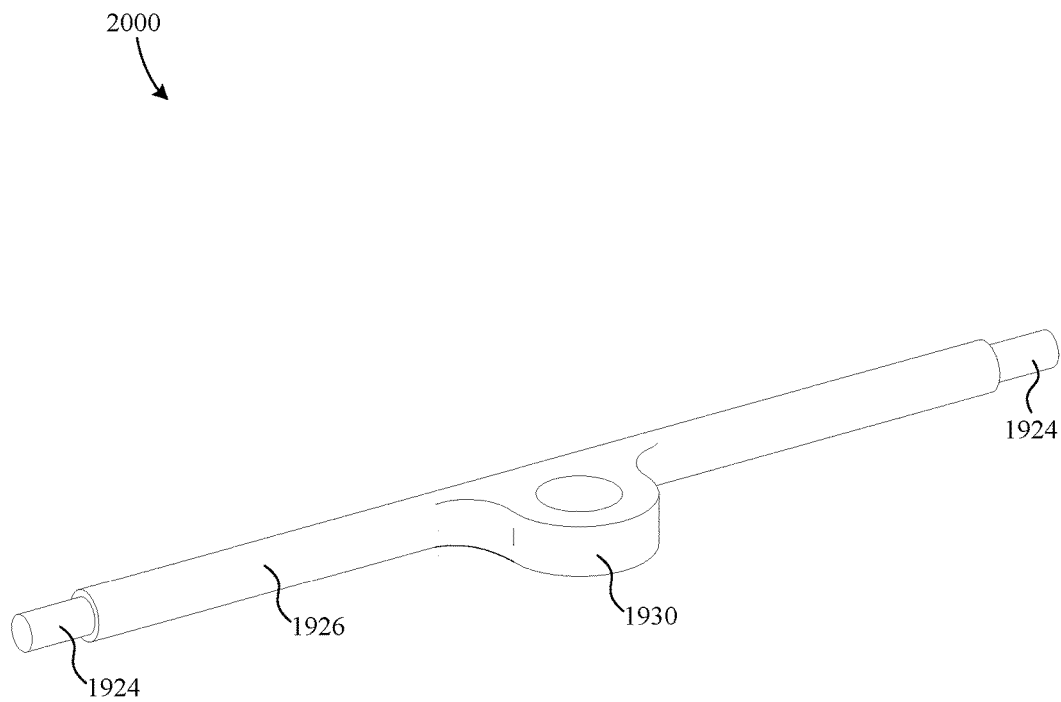
FIG. 20 is a perspective view of a section of the collapsible plant support structure of FIG. 19C.

FIG. 20 shows a perspective view of a section 2000 of collapsible plant support structure 1900. As shown, section 2000 include a section of metal coil 1924 having a resin shell 1926 and a resin ring feature 1930 formed thereon. Resin ring feature 1930 is adapted to slidably engage the exterior surface of a vertical support structure 1216 or the like.

Figure 21:
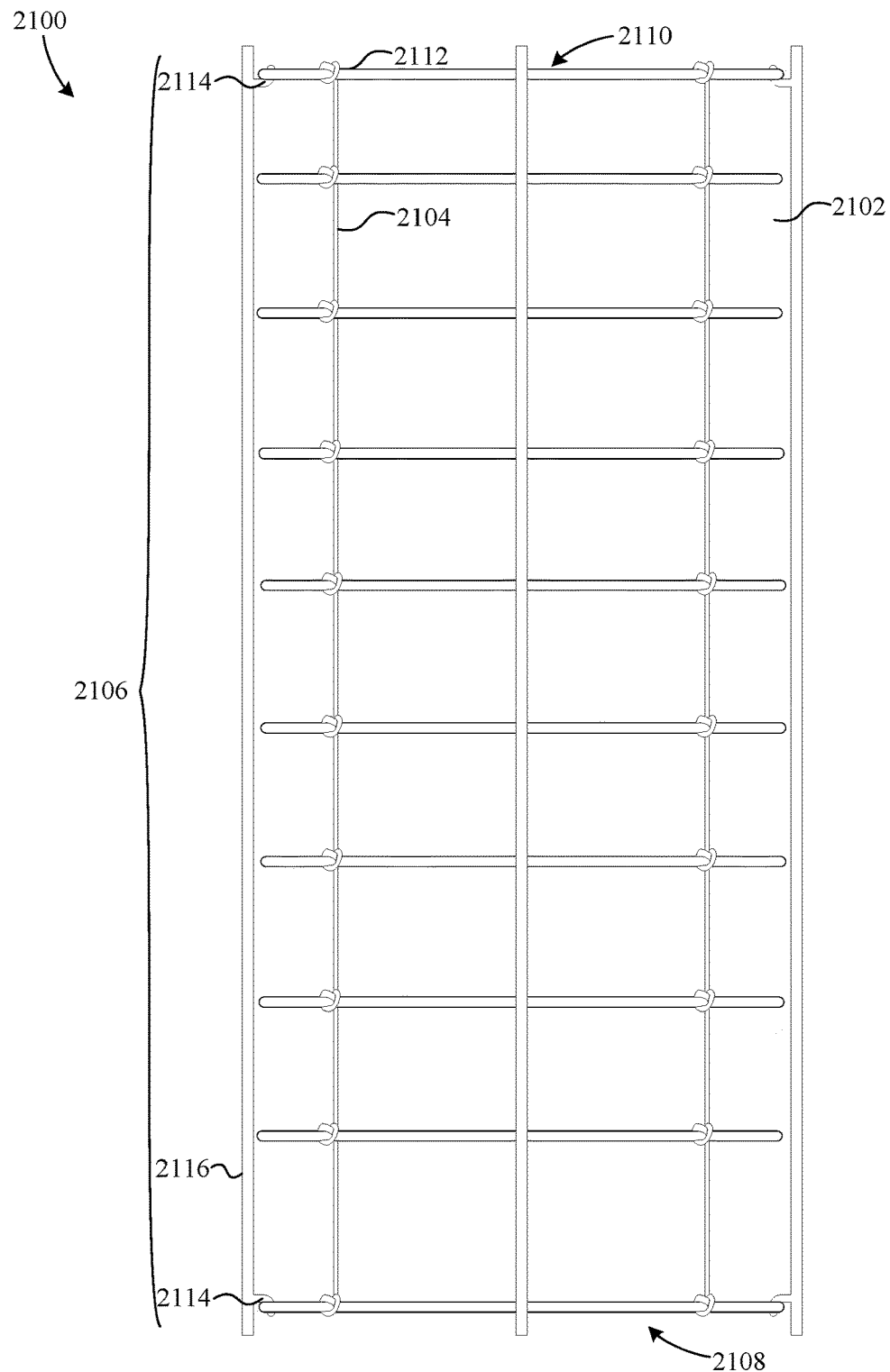
FIG. 21 is a side view of a collapsible plant support structure according to another embodiment of the present invention.

FIG. 21 shows a side view of a collapsible plant support structure 2100 according to another embodiment of the present invention. Plant support structure 2100 includes a plurality of discrete rigid rings 2102, a plurality of vertical structures 1204, and a plurality of vertical support structures 1206. The bottom one of rings 2102 defines a bottom region 2108 and an opposite top one of rings 2102 defines a top region 2110 of collapsible plant support structure 2100. Vertical structures 2104 are formed from individual pieces of cord that are each tied into knots 2112 attached to each of rings 2102. Alternatively, vertical structures 2104 can be formed from individual pieces of elastic cord tied to each of rings 2102. Each of vertical support structures 2106 includes two ring engaging features 2114 and a columnar structure 2116 disposed therebetween. In this example, ring engaging features 2114 are outward facing hooks that engage both the bottom and top ones of rings 2102. Each of columnar structures 2116 is a rigid column structure formed from some suitable material such as, for example, plastic, metal, fiberglass, wood, etc. Collapsible plant support structure 2100 can be broken down for storage simply by disengaging rings 2102 from ring engaging features 2114. With ring engaging features 2114 disengaged, rings 1202 collapse down into a small form factor for storage, shipping, etc.

Figure 22:
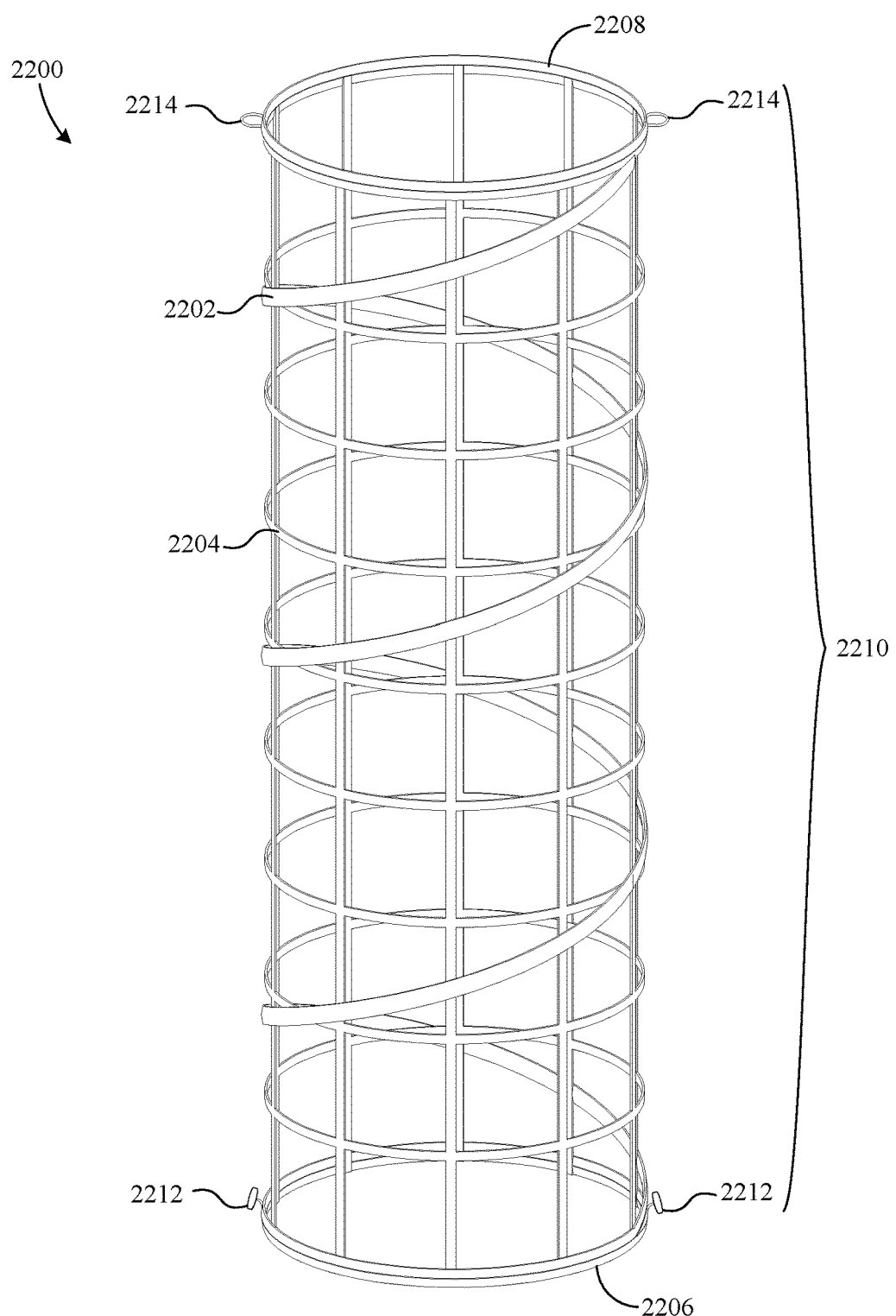
FIG. 22 is a perspective view of a collapsible plant support structure according to yet another embodiment of the present invention.
Figure 23:
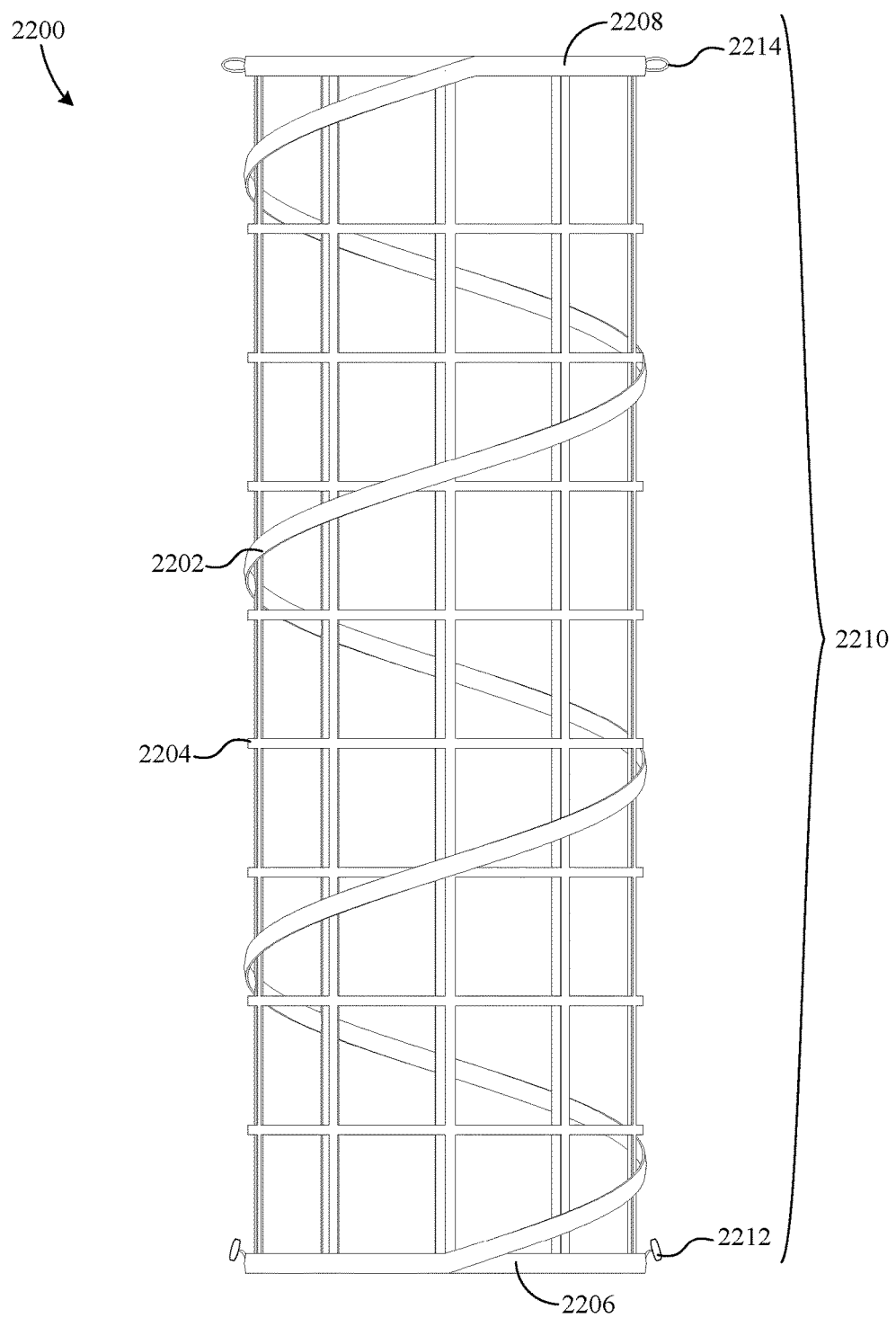
FIG. 23 is a side view of the collapsible plant support structure of FIG. 22.

FIG. 22 and FIG. 23 show a perspective view and a side view, respectively, of another example collapsible plant support structure 2200 in an open (deployed) state. In this particular embodiment, collapsible plant support structure 2200 includes a collapsible coil 2202 and a flexible mesh (e.g., net, web, lattice, etc.) 2204 coupled thereto. Collapsible coil 2202 has a resistance to compression sufficient to support plants without collapsing, yet is capable of being compressed by a user when not in use.

Coil 2202 includes a bottom portion 2206 and an opposite top portion 2208. Bottom portion 2206 is defined by an end of coil 2202 that is wound in a plane and fastened such that bottom portion 2206 is adapted to rest on a flat surface (e.g., ground, floor, deck, etc.). Similarly, top portion 2208 is defined by an opposite end of coil 2202 that is wound in a plane and fastened to form a substantially planar top of plant support structure 2200.

Flexible mesh 2204 provides both horizontal and vertical support to plants when coil 2202 is deployed. In the example embodiment, mesh 2204 is formed from a thin, strong, flexible plastic film that is stitched to the interior of coil 2202. However, those skilled in the art will recognize that mesh 2204 can be formed from many suitable materials including, but not limited to, natural or synthetic fabric, nylon, reinforced polymers, and so on. Mesh 2204 can also be fastened to either the interior or exterior of coil 2202 by any suitable fastening means. Mesh 2204 also serves as a retainer, because it prevents coil 2202 from expanding beyond its intended deployed length. Mesh 2204 also provides horizontal and torsional support to coil 2202 in its deployed state and prevents coil 2202 from expanding beyond its intended diameter. In other words, mesh 2204 restrains coil 2202 in its intended shape in its deployed state.

Collapsible plant support structure 2200 further includes a set of retaining features 2210 which, in this example, includes a set of toggle buttons 2212 and complementary loops 2214 for retaining structure 2200 in a collapsed state when not in use. Alternatively, toggle buttons 2212 and complimentary loops 2214 can be replaced with any other suitable retaining feature including, but not limited to, hook-and-loop fasteners, ties, an external case, and so on.

Figure 24:
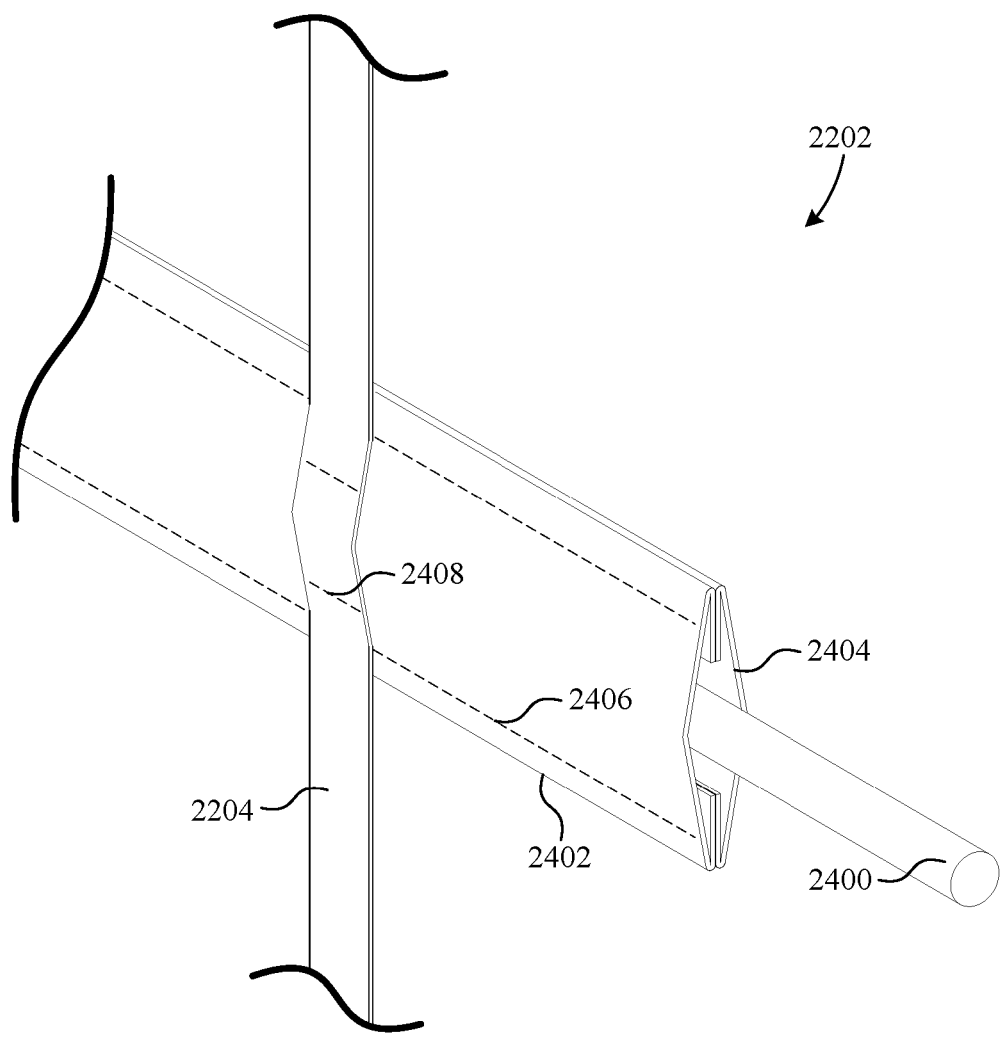
FIG. 24 is a perspective view of a section of the coil and mesh of the collapsible plant support structure of FIG. 22.

FIG. 24 shows a perspective view of a section of coil 2202 and a section of mesh 2204 according to one example embodiment. Coil 2202 includes a wire 2400 disposed within a sleeve 2402. Wire 2400 is essentially a spring steel wire coil having moderate resistance to compression such that it can be easily compressed to a very small size during shipping and/or storage, but is sufficient to support plants without collapsing when deployed. Indeed, coil 2202 exerts a sufficient expansive force to support plants without the need for any additional support members. Sleeve 2402 provides a means for securing mesh 2204 to wire 2400 and is formed from flexible fabric 2404 that is fastened together via stitching 2406. Mesh 2204 is also fastened directly to sleeve 2402 via stitching 2408.

In the example embodiment, wire 2400 has a natural tendency to straighten out but is held in a helical position by sleeve 2402 and mesh 2204. The natural tendency of wire 2400 to straighten out provides force sufficient to deploy mesh 2204 in an open cylindrical configuration. Although wire 2400 is somewhat of a straight wire that is held in a loaded helical position, it could be substituted with a coil that naturally takes the form of a helix without having to be retained by mesh 2204 and/or sleeve 2402. In such a case, the purpose of sleeve 2402 would be to fasten mesh 2204 to the already helical wire. In another alternate embodiment, mesh 2204 can be fixed directly to wire 2400 by some suitable means (e.g., adhesive, through-holes formed in mesh 2204, etc.) thus eliminating the need for sleeve 240.

Figure 25:
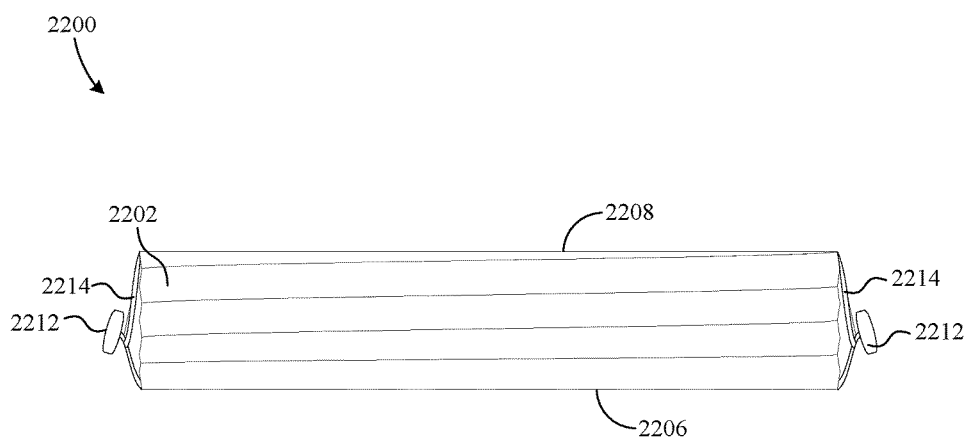
FIG. 25 is a side view of the collapsible plant support structure of FIG. 22 in a compressed state.

FIG. 25 shows a side view of collapsible plant support structure 2200 in a compressed, closed state. As shown, structure 2200 is held in the compressed state by first urging bottom region 2206 and top region 2208 toward one another. Once compressed, coil 2202 is held in place while each of toggle buttons 2212 is inserted into a respective one of complementary loops 2214. When locked in the compressed position, structure 2200 occupies minimal volume and is, therefore, convenient to store and transport. Plant support structure 2200 automatically deploys when toggle buttons 2212 are disengaged from complementary loops 2214.

The description of particular embodiments of the present invention is now complete. Many of the described features may be substituted, altered or omitted without departing from the scope of the invention. For example, alternate fluid network layouts (e.g., larger arrays of plant receptacle receiving elements), may be substituted for the 2×2 array 1800. As another example, the various described coils can have various different characteristics such as number of helical turns, shapes, spring force coefficient, etc. As yet another example, most embodiments are shown with 4 vertical support structures and 4 vertical structures. However, a greater or lesser number of vertical support structures and/or vertical structures can be used. These and other deviations from the particular embodiments shown will be apparent to those skilled in the art, particularly in view of the foregoing disclosure.

I claim:

1. A collapsible plant support structure comprising:
   a coil having an axis, a bottom end and a top end, said bottom end being configured to rest on a planar surface, said coil being collapsible along said axis and having sufficient rigidity to support portions of a plant disposed within said coil;
   a flexible material coupled to said coil and defining a plurality of openings to facilitate the passage of said portions of said plant therethrough, said flexible material configured in a generally cylindrical shape and being coupled to said coil at a plurality of locations to limit the expansion of said coil and the movement of said material with respect to said coil; and wherein
   said flexible material includes flat strips of said material defining said openings therebetween, said flexible material having a thickness and said strips having a width, said width of said strips being greater than said thickness of said material; and
   said openings are wider than said flat strips of said flexible material between adjacent ones of said openings.

2. The collapsible plant support structure of claim 1, wherein said coil includes a substantially straight wire that is secured in a helical position at least in part by said flexible material.

3. The collapsible plant support structure of claim 2, further comprising a flexible sleeve, and wherein:
   at least a portion of said coil is disposed in said flexible sleeve; and
   said flexible sleeved is fastened to said flexible material in a helical configuration around said generally cylindrical shape of said flexible material.

4. The collapsible plant support structure of claim 2, further comprising a flexible sleeve, and wherein:
   at least a portion of said coil is disposed in said flexible sleeve; and
   said flexible material is fastened to said flexible sleeve.

5. The collapsible plant support structure of claim 4, wherein said flexible material is in a mesh configuration.

6. The collapsible plant support structure of claim 5, wherein said plurality of openings includes a uniform array of rectangular openings.

7. The collapsible plant support structure of claim 4, wherein said plurality of openings occupies a majority of a surface of said flexible material configured in said generally cylindrical shape.

8. The collapsible plant support structure of claim 1, wherein said coil includes a wire having a natural helical shape.

9. The collapsible plant support structure of claim 8, wherein said flexible material is connected directly to said wire.

10. The collapsible plant support structure of claim 1, further comprising a retaining feature operative to retain said coil in a compressed position when said collapsible plant support structure is not in use.

11. The collapsible plant support structure of claim 10, wherein said retaining feature includes a toggle button and loop fastener.

12. The collapsible plant support structure of claim 1, wherein said coil is formed from spring steel.

13. The collapsible plant support structure of claim 1, wherein said plurality of openings includes a uniform array of rectangular openings with two edges of each rectangular opening oriented vertically and two edges of each rectangular opening oriented horizontally when said bottom end is resting on a horizontal surface.

14. The collapsible plant support structure of claim 1, wherein said bottom end of said coil is open.

15. The collapsible plant support structure of claim 14, wherein said top end of said coil is open.

16. The collapsible plant support structure of claim 1, wherein said flexible material is a sheet of flexible material having said openings formed therein to define said flat strips.

17. The collapsible plant support structure of claim 1, wherein said flexible material is a reinforced polymer.

18. The collapsible plant support structure of claim 1, wherein said flexible material is a fabric.

* * * * *